US006883084B1

(12) United States Patent
Donohoe

(10) Patent No.: US 6,883,084 B1
(45) Date of Patent: Apr. 19, 2005

(54) RECONFIGURABLE DATA PATH PROCESSOR

(75) Inventor: Gregory Donohoe, Albuquerque, NM (US)

(73) Assignee: University of New Mexico, Albuquerque, NM (US)

( * ) Notice: Subject to any disclaimer, the term of this patent is extended or adjusted under 35 U.S.C. 154(b) by 370 days.

(21) Appl. No.: 10/206,517

(22) Filed: Jul. 25, 2002

Related U.S. Application Data

(60) Provisional application No. 60/307,739, filed on Jul. 25, 2001.

(51) Int. Cl.[7] ............................................. G06F 13/00
(52) U.S. Cl. .............................. 712/1; 712/11; 712/15; 712/16
(58) Field of Search ........................... 71/1, 10, 11, 15, 71/16

(56) References Cited

U.S. PATENT DOCUMENTS 4,839,851 A    6/1989  Maki .......................... 364/900

OTHER PUBLICATIONS

Donohoe et al., "Reconfigurable Data Path Processor for Space", Proceedings of the Military and Aerospace Applications of Programmable Logic Devices 2000, Laurel, MD, Sep. 24–28, 2000.*

Donohoe et al., "Adaptive Computing for Space", 42nd Midwest Symposium on Circuits and Systems, Aug. 8–11, 1999, vol. 1, pp. 126–129, IEEE.*

Seth Copen Goldstein et al., "PipeRench: A Reconfigurable Architecture and Complier," Apr. 2000 pp. 70–77.

Masakatsu Maruyama et al., "An Image Signal Multiprocessor on a Single Chip," IEEE Journal of Solid–State Circuits, vol. 25, No. 6, Dec. 1990, pp. 1476–1483.

* cited by examiner

*Primary Examiner*—William M. Treat

(57) ABSTRACT

A reconfigurable data path processor comprises a plurality of independent processing elements. Each of the processing elements advantageously comprising an identical architecture. Each processing element comprises a plurality of data processing means for generating a potential output. Each processor is also capable of through-putting an input as a potential output with little or no processing. Each processing element comprises a conditional multiplexer having a first conditional multiplexer input, a second conditional multiplexer input and a conditional multiplexer output. A first potential output value is transmitted to the first conditional multiplexer input, and a second potential output value is transmitted to the second conditional multiplexer output. The conditional multiplexer couples either the first conditional multiplexer input or the second conditional multiplexer input to the conditional multiplexer output, according to an output control command. The output control command is generated by processing a set of arithmetic status-bits through a logical mask. The conditional multiplexer output is coupled to a first processing element output. A first set of arithmetic bits are generated according to the processing of the first processable value. A second set of arithmetic bits may be generated from a second processing operation. The selection of the arithmetic status-bits is performed by an arithmetic-status bit multiplexer selects the desired set of arithmetic status bits from among the first and second set of arithmetic status bits. The conditional multiplexer evaluates the select arithmetic status bits according to logical mask defining an algorithm for evaluating the arithmetic status bits.

42 Claims, 13 Drawing Sheets

RECONFIGURABLE DATA PATH PROCESSOR

RELATED APPLICATIONS

The present application claims priority of the Provisional U.S. Patent Application No. 60/307,739 filed on Jul. 25, 2001 and entitled "RECONFIGURABLE DATA PATH PROCESSOR." The Provisional U.S. Patent Application No. 60/307,739 filed on Jul. 25, 2001 and entitled "RECONFIGURABLE DATA PATH PROCESSOR" is herein incorporated by reference.

GOVERNMENT LICENSE RIGHTS

The U.S. Government has a paid-up license in this invention and the right in limited circumstances to require the patent owner to license to others on reasonable terms as provided by terms of the Federal Grant No. NAG5-9469 awarded by NASA for the project entitled "RECONFIGURABLE DATA PATH PROCESSOR," and the Federal Grant No. NAG5-9704 awarded by NASA for the project entitled "SOFTWARE FOR RECONFIGURABLE PROCESSOR."

FIELD OF THE INVENTION

The present invention relates to a reconfigurable data processing pipeline which is adapted to parallel processing in ultra low power CMOS circuitry. More specifically, the present invention relates to a reconfigurable data processing pipeline which is adapted to parallel processing in ultra low power CMOS circuitry through the data path switching of a conditional multiplexer controlled by an evaluation of arithmetic status bits produced during data processing.

BACKGROUND OF THE INVENTION

Owing largely to the history of microprocessor development, the von Neumann processor, with a single arithmetic-logic unit through which all data must pass, is a common reference against which other processing models are compared. The computational model incorporating the von Neumann processor typically envisions a sequential processor, a randomly-addressable memory, a single arithmetic-logic unit (ALU), and a control unit. The memory stores information and instructions, and the ALU transforms bit patterns. The control unit reads data and instructions from memory and routes data through the ALU, and back into memory. This Computational model is deeply embedded in programming languages such as C and Mathlab. For example, when the computer executes a function, such as sin(x), the main flow of execution stops; the sin(x) function is executed, typically to termination, and the main program flow resumes where it left off. Sequential processors execute alternative computations by switching the program flow through conditional branching. Program agility is thus achieved by changing the flow of execution. Time efficiency is not intrinsic in a sequential model of operation. According to different control inputs, different programs or subprograms are granted run-priority. In one case, the processor executes one sequence of instructions. In another case, the processor executes a different sequence of instructions.

FIG. 1 illustrates one embodiment of a von Neumann type processor. An input 101 is received by the microprocessor 105. A memory module 103 coupled to the microprocessor 105 contains various processes and algorithms for processing incoming data, and is capable of downloading these programs into the processor 105. An output module 107 is coupled with the processor output, and is capable of receiving the processor output.

FIG. 2 is an exemplary looping process commonly occurring in conjunction with the architecture of the von Neumann processor illustrated in FIG. 1. According to the Step 110, the processor 105 receives input data "D" from the input module 101. According to the step 112, a counter value "n" is set to one. According to the step 114, the process n within the memory area 103 is loaded into the microprocessor 105. According to the step 116, the data D is processed with algorithm n. According to the step 118, the output module 107 evaluates whether the processed data falls within a pre-determined range. According to the step 120, if the processed data falls within the pre-determined range, the processed data is sent to the output 120. If in the step 118, the processed data falls outside the predetermined range, the value n is incremented by one in the step 122, and the process returns to the step 114, loading the process n into the microprocessor. According to the process illustrated in FIG. 2, the "looping" is recurrent until a desired data outcome is derived. The number of loops may be determined by control signals which are themselves generated by output data. Alternatively, the number of loops may depend upon the execution of a predetermined sequence of operations. The process illustrated in FIG. 2 is exemplary of one form of a "looping" program, wherein successive outputs are discarded if they are not within a specified range. Alternative looping programs are possible, such as accumulating successive outputs of processed data which have been processed by various algorithms successively loaded into the processor. The essential point illustrated by FIG. 2, however, is that looping programs which require multiple iterations become time consuming, each iteration consuming more and more processing time. The same phenomena occurs with branching programs wherein a branch "dead ends" and must be recalculated according to a different algorithm. Thus, such architectures are not time optimized.

A second limitation of serial processing techniques generally associated with RISC (Reduced Instruction Set Computer), DSP (Digital Signal Processor) and von Neumann type serial processors inheres from the inability of serial processing techniques to take full advantage of ultra low power ("ULP") technology. In spacecraft applications, the need to conserve power is critical. This makes ultra low power (ULP) technology particularly attractive in spacecraft applications. The limitation of serial processing techniques in ULP technology can be illustrated by understanding the sources of power consumption in a CMOS circuit. Dynamic power consumption occurs when a transistor switches state, and is proportional to the square of the voltage. From this, it is easily understood that, when power voltage levels are reduced from approximately five volts to approximately one-half volt, dynamic power consumption may be reduced somewhere on the order of two orders of magnitude. Static, or parasitic power consumption, on the other hand, is generally proportional to the source of the drain area, and therefore increases with the number of transistors in the circuit. Static power dissipation generally occurs due to leakage in parasitic source and drain diodes. In conventional CMOS circuits in the 5 volt range, the dynamic power consumption is typically the dominant source of energy consumption. For this reason, there is little parallelism in most serial type processing models. However, if the same fundamental schematic used in a traditional 5-volt CMOS circuit were used for a ULP circuit, the ratio of power lost through static or parasitic power consumption would increase. Static power consumption occurs regardless of processing.

Additionally, resistance to radiation is particularly vital in spacecraft applications. Without the earth's atmosphere, a circuit in outer space is bombarded with a higher level of background radiation than earthbound circuits. However, traditional CMOS processors are not easily radiation hardened without a significant performance degradation. Without radiation hardening, single event upsets, single event latchup, total ionizing dose and other radiation effects due to cosmic bombardment dramatically increase the likelihood of onboard failure in spacecraft applications.

The single processing path concept inherent in the von Neumann processor, is often referred to as exhibiting "minimum granularity." As illustrated in FIG. 3, the von Neumann processor is at one end of the granularity spectrum. RISC and DSP processors are more granular than von Neumann processors. At the other end of the spectrum are Field Programmable Gate Arrays (FPGAs). FPGAs have maximum granularity, and are programmable down to the gate level. Fine-grained reconfigurable granularity offers great flexibility, and enables the architecture of the processor to be modified to closely match the architecture of the computation problem, offering the possibility of very high performance. However, fine-grained reconfigurability exacts a high price in area. It is estimated that only 1% of the area of a typical FPGA is available for useable logic; the rest is consumed in interconnect and configuration memory. Within the spectrum illustrated in FIG. 3, complex programmable logic devices (CPLDs) are slightly less granular than FPGAs, while digital signal processors (DSPs) and superscalar CPUs are more granular than simple von Neumann-type microprocessors. Additionally, FPGAs are not typically radiation-hardened, making them particularly failure-pron in spacecraft applications where cosmic rays are unfiltered by the earth's atmosphere. Manufacture of radiation-tolerant FGPAs exacts a large prince in that the currently-available radiation-tolerant FGPAs have two orders of magnitude fewer equivalent gates than non-hardened FGPAs. Moreover, complex models synthesized from existing gates in FPGAs cannot take advantage of the circuit-level and layout-level optimizations which are attainable when these models are designed by hand.

What is needed, therefore, is a processor design configuration method that can be used advantageously in ULP applications. Additionally, the need exists for a processor that can be easily manufactured to exhibit a high degree of radiation tolerance. The need also exists for a processor which can reduce the amount of wasted CMOS circuitry associated with Field Programmable gate array devices. There is further a need for a processing device that is user-configurable to maximize efficiency. There is a further need for a processing device that reduces or eliminates conditional branching, looping, retracing and re-calculating of data, as well as other programming procedures that slow processing throughput.

SUMMARY OF THE INVENTION

The present invention eliminates branching, simplifies looping, and reduces retracing and re-calculating by using parallel processing with conditional multiplexers which conditionally switch data paths according to control inputs derived from the data being processed, including the conditional selection of data for processing in parallel data paths. The present invention further provides a processor that can take advantage of the reduction in dynamic power consumption in a ULP circuit through greater parallelism. The present invention further provides a processor which can be easily manufactured to exhibit a high degree of radiation tolerance.

A reconfigurable data path processor comprises a plurality of independent processing elements. Each of the processing elements advantageously comprises an identical architecture. Each processing element comprises a multiplier and an arithmetic logic unit, each capable of simultaneously processing data. According to the preferred system configuration, the multiplier and the arithmetic logic unit can process the same data from a processing element input, or process separate data received from separate processing element inputs. Additionally, the processing element can be configured such that the output of the multiplier can form an input of the arithmetic logic unit, and the output of the arithmetic logic unit can form an input to the multiplier. Each processing element further comprises a conditional multiplexer having a first conditional multiplexer input, a second conditional multiplexer input and a conditional multiplexer output. The conditional multiplexer output is coupled to a first processing element output. At least two processable values can be received at the inputs of the processing element.

The processing element processes the first processable value according to a first algorithm, and a second processable value according to a second algorithm, generating first and second processed values. The first processed value is transmitted to the first conditional multiplexer input, and the second processed value is transmitted to the second conditional multiplexer input. A set of arithmetic bits are generated according to the processing of the first processable value. The conditional multiplexer evaluates the arithmetic status bits according to a logical mask defining an algorithm for evaluating the arithmetic status bits. The bit pattern of the logical mask is advantageously downloaded into the processor during the configuration process. According to the evaluation of the arithmetic status bits, the conditional multiplexer selects a data path which couples the first conditional multiplexer input to the conditional multiplexer output and a second data path which couples the second conditional multiplexer input to the conditional multiplexer output. According to one embodiment, various additional data paths within the processing element are selected and configured during a configuration stage prior to the processing of data.

According to one embodiment, an arithmetic-status bit multiplexer selects a set of arithmetic status bits from at least two sets of arithmetic status bits generated by at least two different processing operations. The configuration of the arithmetic bit multiplexer is advantageously performed during the configuration stage.

DETAILED DESCRIPTION OF THE PRESENT INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. For example, although the invention described herein is especially useful in space craft applications, the exemplary use of this application herein is not intended to limit the applications of the present invention to space craft applications. Accordingly, many examples and numerous specific details are set forth within the detailed description of this invention in order to provide a thorough understanding of the present invention, and the best mode of its use. However, it will be readily understood to one of ordinary skill in the art that the present invention may be practiced without these specific details. In other instances, well-known methods and procedures, components and circuits haven not been described in detail so as not to unnecessarily obscure aspects of the present invention.

Figure 1:
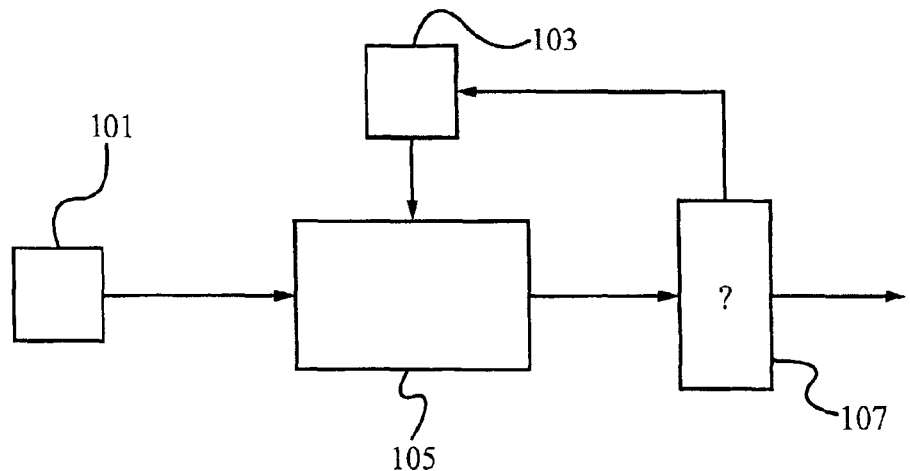
FIG. 1 depicts a von Neumann type serial processor.
Figure 2:
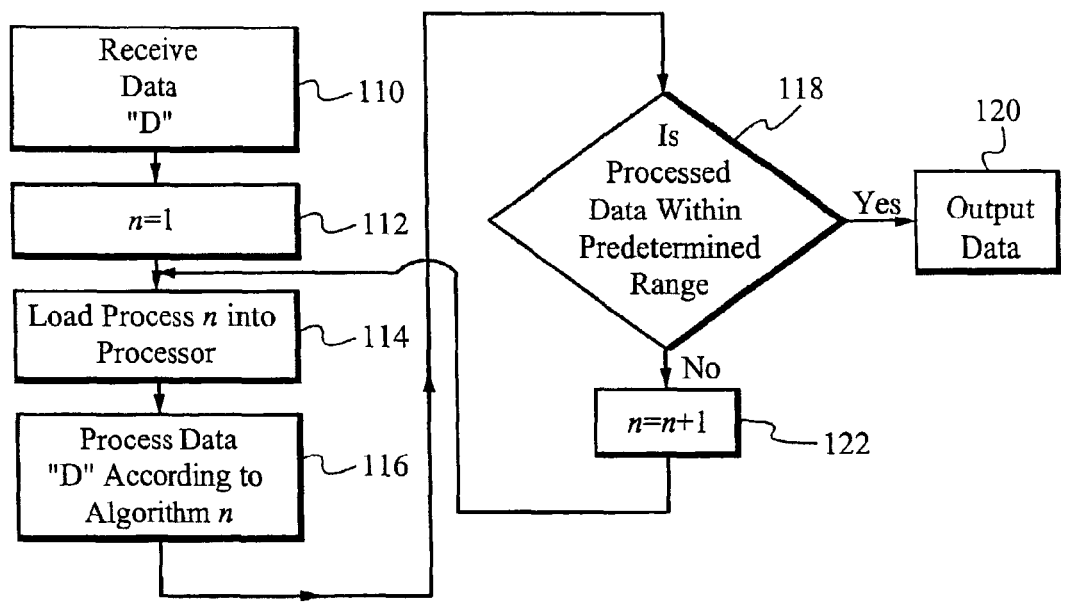
FIG. 2 illustrates a looping-type program run in a serial processor.

The reconfigurable data path processor (RDPP) of the present invention is based on a synchronous pipeline model. In this model, multiple processing elements ("PEs") are coupled in a network, and data and control information flow between them. As discussed above, the von Neumann model relied on sequential operations to be selected and performed as a result of conditional branching, to the neglect of alternative operational paths. In the RDPP, execution agility is achieved, not through conditional branching of execution as illustrated in FIGS. 1 and 2, but through conditional switching of data paths. Two or more alternative computations can be carried out in different processing elements within separate branches of a network. The alternative computations can be performed simultaneously through the use of multiple programming elements ("PEs") which run concurrently. Each operating programming clement produces at least one output data set. Through conditional multiplexing controlled by the processing of input data, and crossbar switching defining pre-determined data paths at configuration time, data produced through parallel operations may be segregated into usable data and unusable data. The usable data is incorporated for further processing, for ultimate output, storage or any combination thereof. The un-usable data generated in parallel operations is discarded. Because unusable data is generated in parallel processing operations, it does not increase the throughput time of data processing.

Power conservation is particularly desired in spacecraft applications, and ultra low power "ULP" technology is therefore a useful tool in optimizing microprocessor technology in spacecraft applications. The present invention is particularly suited for implementation in ultra-low-power, radiation tolerant CMOS using an AMI $0.35\mu$ process. To maximize the power savings in ULP applications, the present invention includes architectural parallelism within the data path which is capable of approaching the optimal ratio between static and dynamic power consumption, while simultaneously increasing processing speed.

Figures 3, 4:
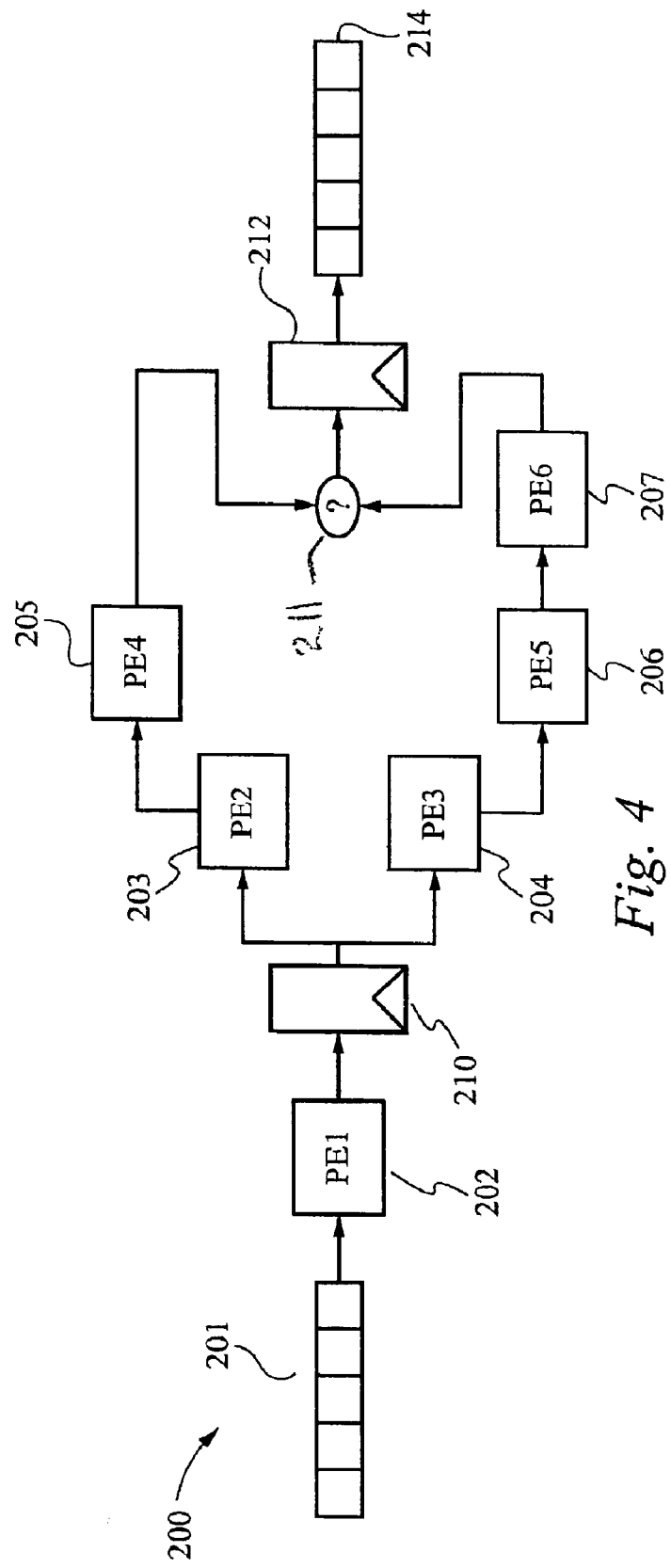
FIG. 3 illustrates a spectrum of processor granularity.
FIG. 4 illustrates a parallel pipeline architecture.

FIG. 4 illustrates an overview of some of the basic properties of a synchronous pipelined processor according to the present invention, which will be discussed in greater detail in subsequent drawings. The processor is regarded as synchronous because a common clock pulse drives coordinated processing elements 202–207 comprising the RDPP pipeline. After receiving input data from an input cache 201, the processing element PE1 202 processes the input data and sends the processed input data to multiplexer 210. The data is then coupled through parallel programming paths to programming element PE2 203 and PE3 204. If both PE2 203 and PE3 204 are configured to receive data simultaneously, the multiplexer 210 is programmed to couple an output to PE2 203 and PE3 204, simultaneously. Alternative embodiments are envisioned, however, wherein the coupling of inputs to parallel programming elements PE2 203, PE3 204 from a common source such as the multiplexer 210 can be delayed until all of the parallel units are ready to receive an input.

When the processing element PE2 203 has completed processing, PE2 203 couples an output of processed data to the input of processing element PE4 205 for further processing. When the processing element PE3 204 has finished processing its data, PE3 204 couples an output of processed data to PE5 206. Similarly, when PE5 has completed processing, it couples its output of processed data to PE6 207. Each processing element thus processes the data received at its input, and couples it to the next processing element in the pipeline. Eventually, the outputs of processing elements PE4 205 and PE6 207 converge into a single path in a conditional switch 211.

Within each processing element 203–207 is a conditional multiplexer with at least two conditional multiplexer inputs and a single conditional multiplexer output. Each conditional multiplexer is controllably switched to select the conditional multiplexer output from among one of the two conditional multiplexer inputs. The conditional multiplexer is dynamically switched according to the value of various arithmetic status bits derived from a mathematical operation being performed within each of the respective processing elements. As discussed in conjunction with FIG. 6, the dynamic switching of the "conditional" multiplexer stands in contrast to the switching of the plurality of "selective" multiplexers, for which the switching state and selected data path is determined prior to system configuration.

In addition to the conditional multiplexer, each processing element 203–207 has a additional output regulated by a crossbar switch. As the two parallel paths converge, at least one of the two outputs of processing element PE4 205 and at least one of the outputs of processing element PE6 207 are coupled to separate inputs input of circuit element 212.

By conditionally switching after data is processed, rather than conditional branching prior to processing, the reconfigurable data path processor of the present invention has the advantage of being able to evaluate the usefulness of processed data according to various arithmetic status bits prior to determining which data is to be ignored and which data is to be utilized. Additionally, after processing data, each processing element has the ability to select unprocessed data through the conditional multiplexer CMUX. Unprocessed data can also be transmitted to a second output through a crossbar switch. However, unlike the CMUX, the input/output selection of unprocessed data by the crossbar switch is not dynamic. It must be made during the configuration process. By processing data in parallel and controlling the flow of data through arithmetic status bits, the present invention does not need to re-calculate data if a first calculation is determined to fall out-of-range or is otherwise unsuitable. Accordingly, the present invention speeds up processing time by reducing the looping and retracing of branches which commonly attends programming features in the prior art. Thus, the network according to the present invention makes decisions through conditional switching of processed data rather than conditional branching to process data according to an algorithm of a particular path at the rejection of an alternative processing algorithm.

Figure 5:
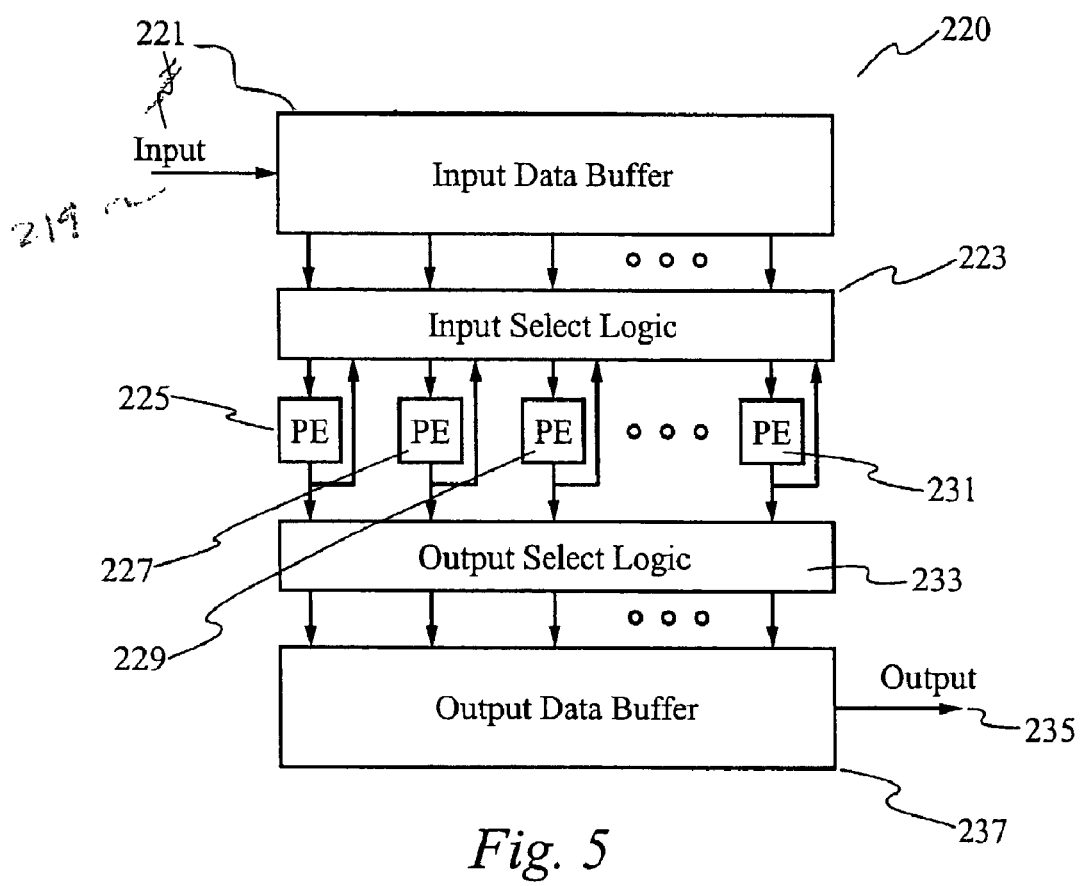
FIG. 5 illustrates an architecture for configuring inter-processing element data paths in a pipeline processor in the present invention.

FIG. 5 illustrates an overview of an array of configurable processing elements within an RDPP 220 according to the preferred embodiment of the present invention. The processing elements 225–231 are coupled linked to each other, and to input and output buffers 221, 237 through a flexible switching network. The input data 219 is coupled to the input data buffer 221, and is directed by the input select logic 223 into an input of a selected processing element or multiple select processing elements 225–231, depending upon operational requirements. After processing, the output of the selected operating processing element or multiple processing elements 225–231 is directed variously to the output select logic 233 and the input select logic 223. If processing is completed, the processing element output is routed to the output data buffer 237. If the output of a processing element 225–231 is to be further processed, the output data from the processing element 225–231 is routed back to the input select logic 223, from which it is directed to the input of another one or multiple processing element 225–233. As will be further understood in conjunction with FIG. 6, each arrow coupling the arithmetic logic-unit of FIG. 5 to a processing element actually represents three separate 24-bit input data paths.

Prior to receiving a first data input 219, the pipeline architecture is established such that select outputs of the predetermined processing elements 225–231 are coupled to select inputs of the various processing elements 225–231. Pipeline architecture is established through the use of a pipeline configuration message or collection of configuration messages. In addition to configuring the data paths between processing elements of the RDPP, configuration messages are used to configure the data paths within the individual processing elements. After the configuration of the pipeline is completed, including inter-PE data paths and intra-PE data paths, the pipeline is ready to process data. The pipeline will continue to process data according to the established architecture until a new set of configuration messages is received. Upon receipt of a new configuration message, the pipeline is reconfigured to process data according to a newly established architecture implemented to perform a different data processing algorithm.

Accordingly, there are two aspects of the configuration process. The first aspect of configuration involves the relationship of various programming elements to each other through the input select logic and output select logic. The second aspect of configuration involves the configuration of individual programming elements, including the pre-loading of various pre-determined constant values in select constant registers within the respective processing elements, and the configuration of select portions of the data path within each processing element by pre-loading various selective multiplexers with control values for controlling the multiplexer switching, as further illustrated in Table 18 herein.

Architecture of the Processing Element

Figure 6:
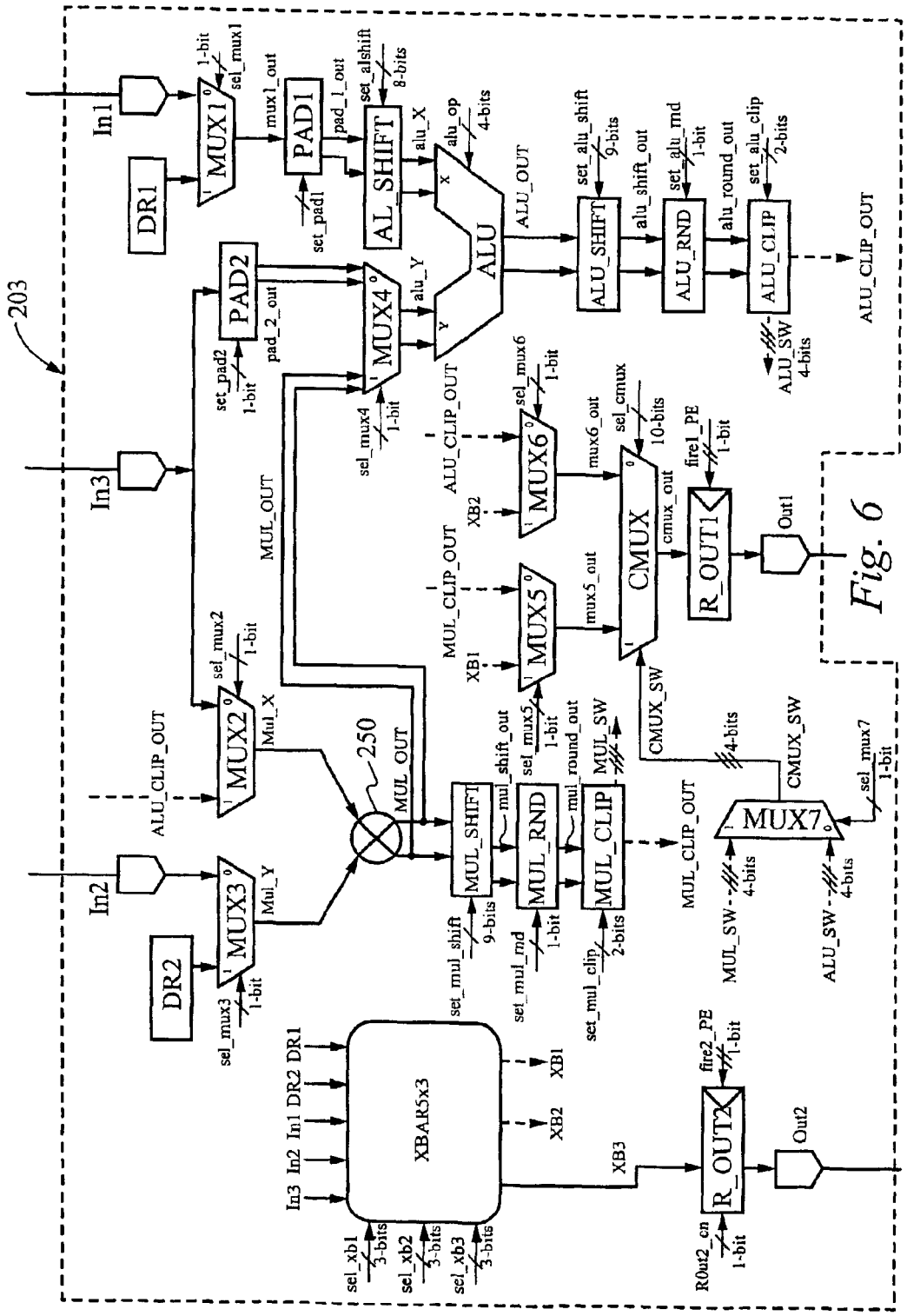
FIG. 6 illustrates a schematic of components and data pathways within a processing element according to the present invention.

FIG. 6 illustrates the components and architecture comprising a single processing element according to the preferred embodiment. Within FIG. 6, control signals, varying from one-bit to 9-bits, and a 10-bit control-signal mask, are represented by the thin arrowed lines. Those control and mask signals which are fixed with pre-determined values during the configuration process are distinguished by a single cross hashing. The fire control signals, fire__1PE and fire__2PE, are not pre-determined during configuration, but are preferably coupled to the clock driving the processing element. They are identified by a double hash-mark. The control signals dynamically generated by arithmetic status bits during processing, ALU__SW, MUL__SW and CMUX__SW, are distinguished by a triple hash mark. The thicker arrowed lines represent 24-bit data paths. Parallel 24-bit data paths entering or exiting a single component represent a 48-bit data path connecting various components. Because of the space limitations of FIG. 6, some data and control lines are not drawn contiguously between two components. Dotted lines are used to identify these discontiguous lines, which are shown coupled to both the source and destination components, with arrows showing the direction of information flow.

FIG. 6 illustrates three inputs In1, In2 and In3 coming into the processing element 203, and the two outputs exiting processing element 203 (FIG. 4). The discussion of FIG. 6 should be taken in conjunction with FIG. 4. According to the preferred embodiment, these inter-PE paths are preferably all 24-bit paths, whereas the data paths between various components within the processing element include 24-bit and 48-bit paths.

As illustrated in FIG. 6 each processing element 203 advantageously includes three 24-bit inputs, In1, In2 and In3, and two main processing components, a multiplier 250 and an arithmetic logic unit ("ALU"). The first input In1 is coupled to the first input of the selective multiplexer MUX1, which is configured to controllably couple or decouple the first input In1 from the first input of the arithmetic logic unit ALU through a sequence of intermediate elements, specifically, the padding module PAD1 and the shift module AL__SHIFT.

The second input In2 is coupled to the first input of the selective multiplexer MUX3, which is configured to controllably couple or de-couple the second input In2 from the first input of the multiplier 250.

The third input, In3, is configured to be controllably coupled to, or de-coupled from the second input of the multiplier 250 by the agency of the selective multiplexer MUX2, and is further configured to couple to or de-couple from the second input of the ALU through the agency of the selective multiplexer MUX4, as further described herein. Accordingly, each processing element may be configured to couple up to two distinct inputs, In2 and In3 to the multiplier 250, and up to two distinct inputs, In1 and In3, to the arithmetic logic unit ALU. Additionally, each processing element 203 may be configured to couple the output of the multiplier 250 to the second input of the arithmetic logic unit ALU, and the output of the ALU to the second input of the multiplier 250, thereby creating substantial processing flexibility as also described in greater detail herein. This processing flexibility in each processing element contributes the power, flexibility, efficiency and speed of the RDPP pipeline.

Examining FIG. 6 in greater detail, the first input, In1, is configured to receive a first 24-bit data stream from the input select logic 223 of FIG. 5, and is coupled to the first input of the selective multiplexer MUX1. Data register DR1 is a 24-bit register which contains a constant numerical value which is pre-loaded during the configuration phase of the pipeline. Data register DR1 is coupled to the second input of the multiplexer MUX1. MUX1 is a selective multiplexer which is controllably configured to select and output data from either its first input, In1, or its second input, DR1. The switching state of the selective multiplexer MUX1 is controlled by the one-bit control signal sel_mux1. As further discussed herein and illustrated in conjunction with the Table 18, the switching state of the control sel_mux1, as well as the state of the other selective multiplexers MUX2 through MUX7 are predetermined at the time of pipeline configuration by pre-loading predetermined control values for the respective control signals during the configuration process. In contrast, the switching status of the conditional multiplexer CMUX, is not pre-determined during the configuration of the processing element, but, as discussed further herein, is conditioned upon a four-bit control signal CMUX_SW derived from arithmetic status bits generated during the data processing within the processing element.

The output of selective multiplexer MUX1 is coupled to the input of the padding module PAD1. The function of the padding module PAD1 can best be illustrated by understanding that the data paths between the processing elements 202–207 are preferably 24-bit paths, whereas data paths within a processing element include both 24-bit and 48-bit data paths. Accordingly, the padding module expands the data path from 24-bits to 48-bits. The 24-bit data paths are designated by the acronym PE_INT, and the 48-bit data paths are designated by the acronym PE_LONG. The maximum and minimum values in a signed 24-bit field are represented by PE_POS_MAX and PE_NEG_MAX respectively. The largest positive number in a signed twenty-four bit field, PE_POS_MAX, is 8,388,607, commonly represented by the hexadecimal value 0x7FFFFF. Those skilled in the art will recall that, in two's compliment binary, "zero" is the first "positive" number, whereas negative-one is the first negative number. Therefore, the scalar value of PE_NEG_MAX is one integer greater than the scalar value of PE_POS_MAX, or negative 8,388,608. Those skilled in the art will further recognize that, when a number is accompanied by a negative sign bit in two's compliment binary, the scalar value increases by adding the zeroes within the field, not the ones. Accordingly, PE_NEG_MAX is typically represented by the hexadecimal value 0x800000. The padding modules converts all data to a 48-bit format for internal processing through one of two padding operations.

In the first padding operation, "pad," the incoming value is a twenty-four bit PE_INT value transmitted from the output of the multiplexer MUX1 to the input of the padding module PAD1. All incoming values are processes as signed values. To store the incoming value within the register of the PAD1 module, the one-bit control signal set_pad1 is set to a binary zero, thereby defining the operation as a "pad" function. According to the "pad" function, the twenty-four bit PE_INT value received from MUX1 is stored in the least significant 24-bits of the 48-bit PAD register. The sign bit is therefore stored in bit 23 of the PAD register, and the most-significant bits within the PAD register, bits twenty-four through forty-seven, are "padded" with zeroes. Accordingly, the sign bit is not located in the most significant bit of the 48-bit PAD register, but is in a middle bit storage location of the register.

Figure 7:
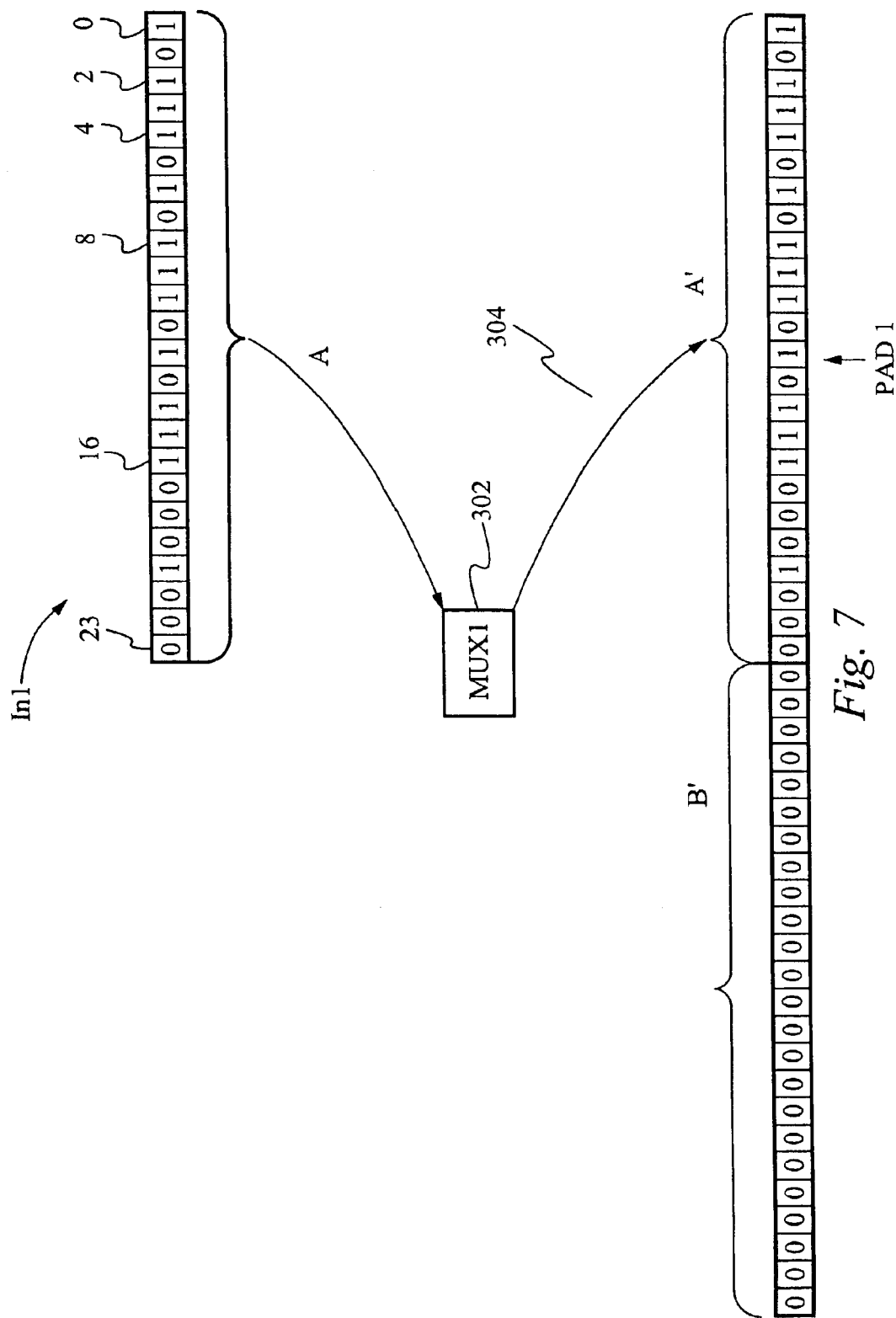
FIG. 7 illustrates the bit flow of a "pad" operation of a padding module.
Figure 8:
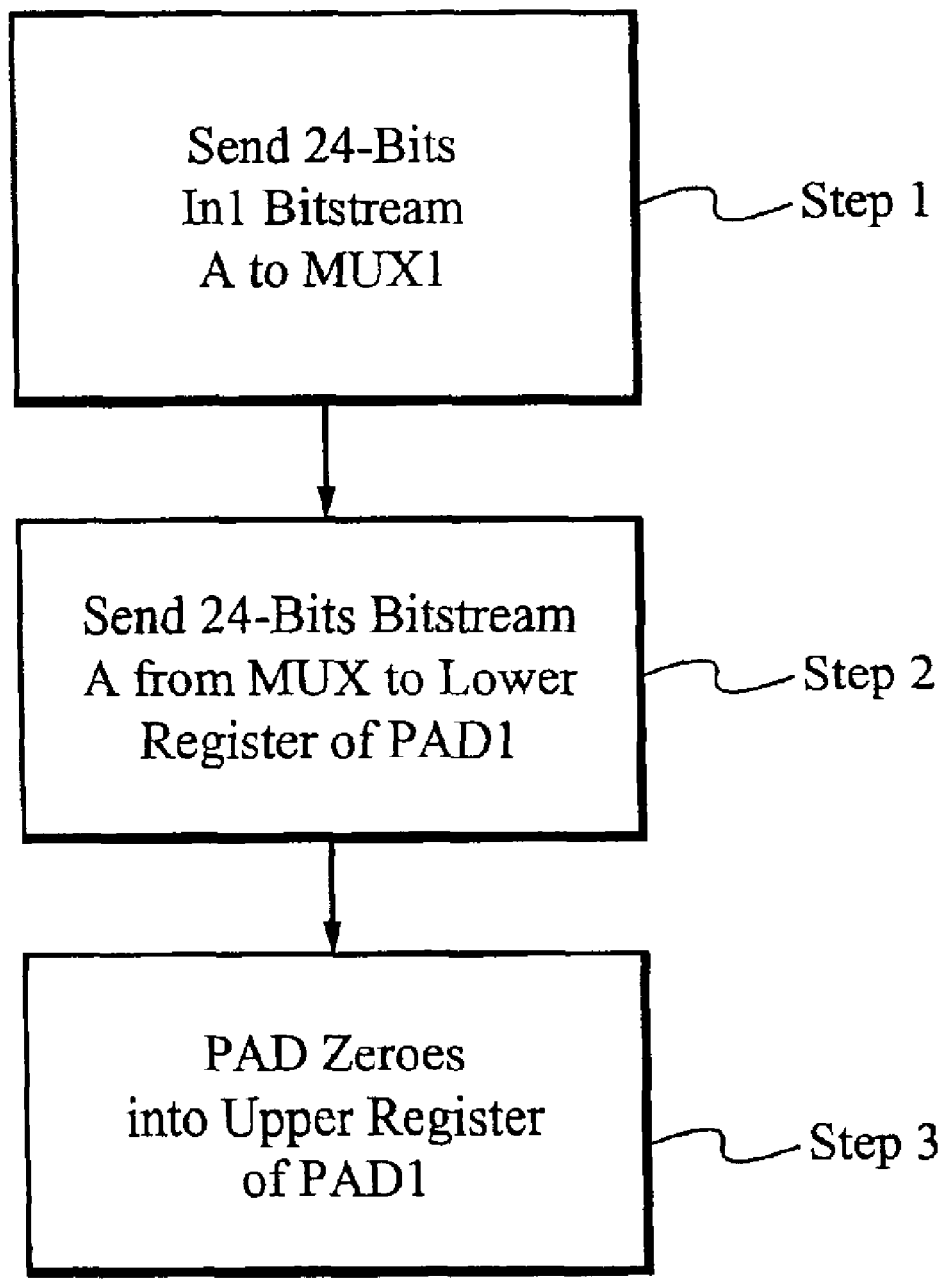
FIG. 8 is a flow chart describing the "pad" operation of a padding module.

FIGS. 7 and 8 illustrate the transfer of a 24-bit value from the input In1 to a 48-bit register in the padding module PAD1 via the multiplexer MUX1. According to the step 1 of FIG. 8, a 24-bit bitstream "A" is sent from the input In1 to the multiplexer MUX1. In the step 2, The 24-bit field "A" is sent from the multiplexer MUX1 to the lower 24-bits A' of the 48-bit register in the padding module PAD1. In the step 3, the padding module PAD1 pads the upper 24-bits register B' of the padding module with zeroes. Each step in FIG. 8 is performed on a clock pulse, such that the entire process requires a minimum of three clock pulses. Alternative embodiments are envisioned, however, wherein the data register within the PAD module is "zeroed-out" between operations. According to this embodiment, step 3 of FIG. 8 is unnecessary. Although the "clearing" or "zeroing out" of such registers would require a clock pulse, the clearing may be done while the processing element PE 203 is not actively processing data, thereby eliminating the step 3 of FIG. 8, thereby reducing actual processing time.

When the padding module PAD1 operates according to the second, or "sign extended" mode, (abbreviated "sign_ext"), the value to be stored in the padding module register has more than twenty-four actual bits of data. Accordingly, both the lower register (the least significant 24-bits) and the upper register of the padding module PAD1 will store actual data. Because the incoming data path of In1 is only 24-bits, the receipt and storage of a PE_LONG value over a 24-bit data path must occur over several clock pulses. To control storage of a PE_LONG value in the 48-bit PAD register, the control signal set_pad1 is set to a binary one, which defines the "sign extended" function.

Figure 9:
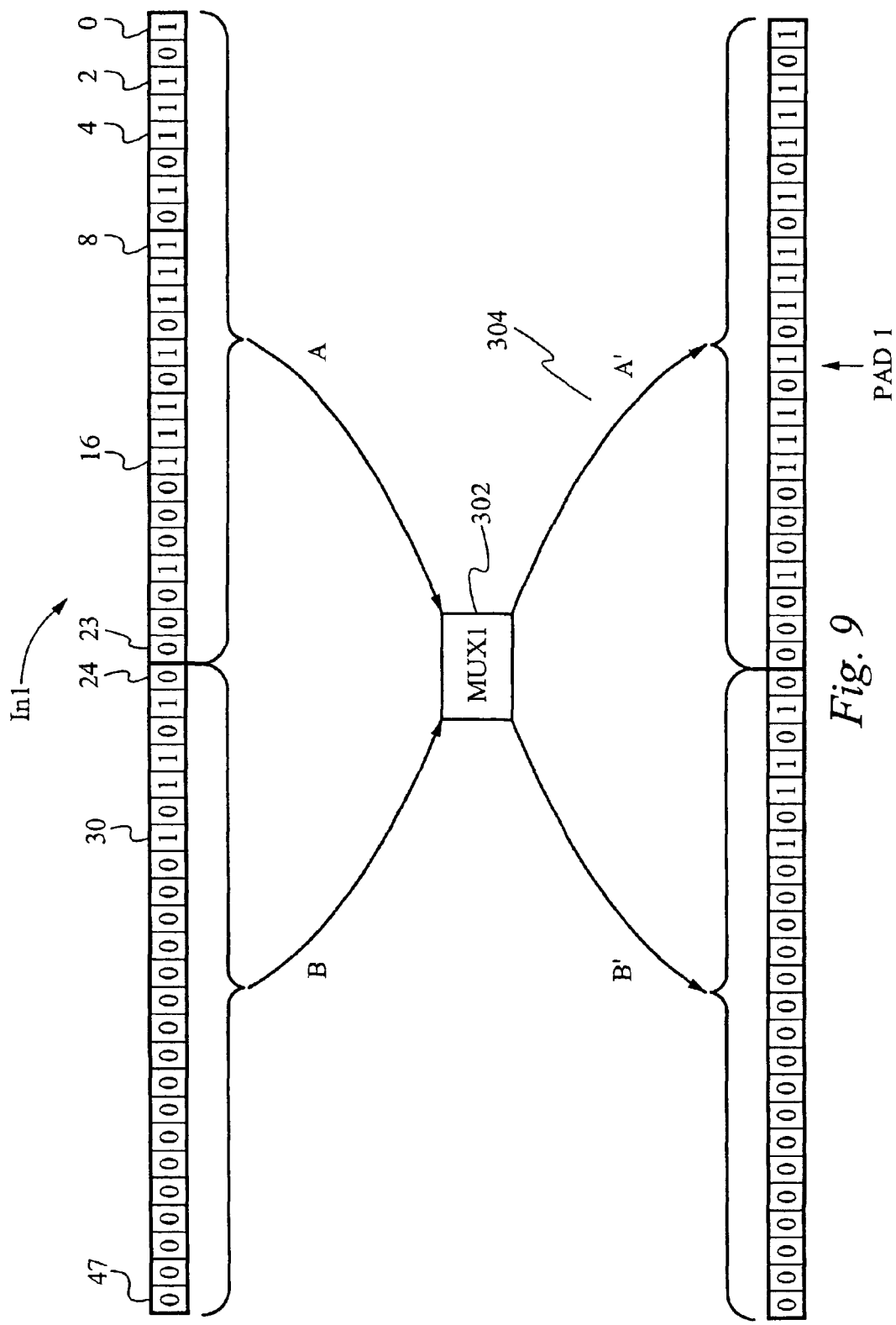
FIG. 9 illustrates the bit flow of a "sign extension" operation by a padding module.
Figure 10:
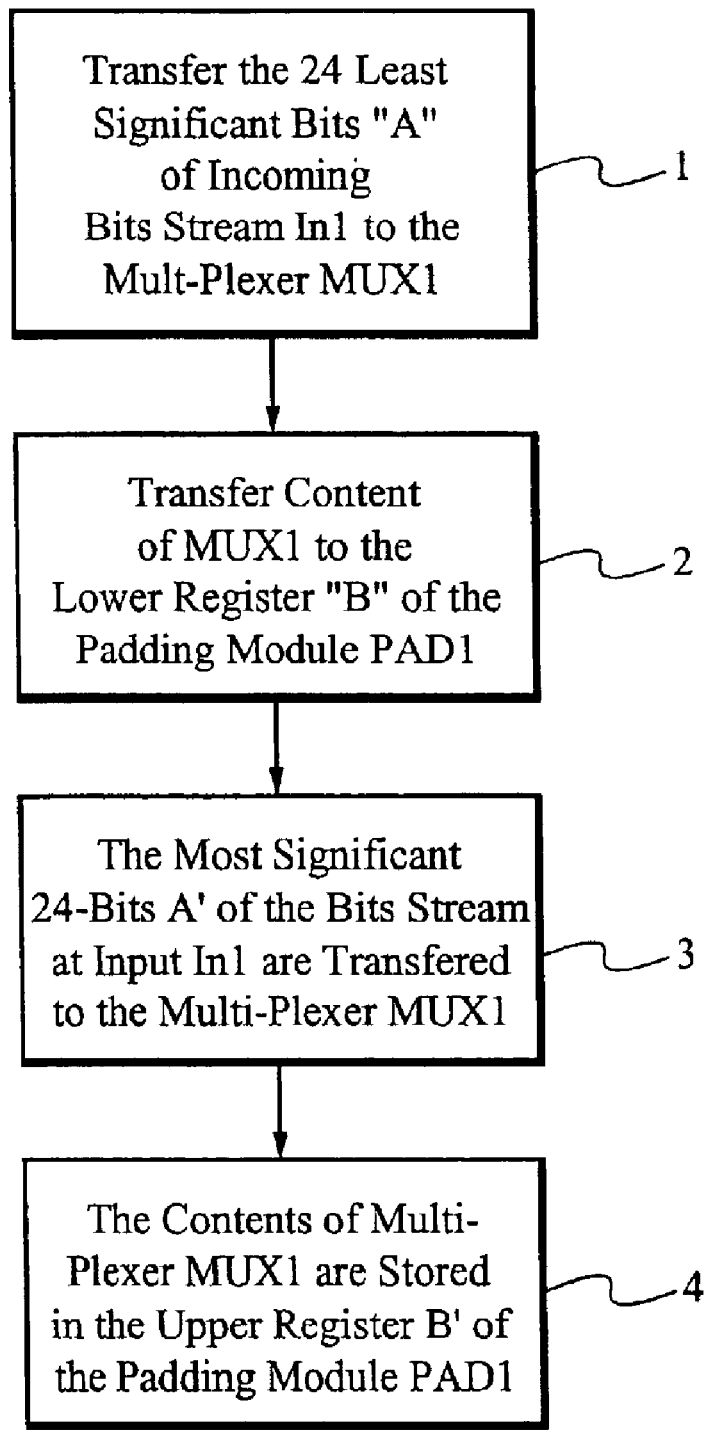
FIG. 10 is a flow chart describing the "sign extension" operation of a padding module.

FIGS. 9 and 10 discloses a process for storing a 48-bit value from the input In1 into the 48-bit register of the padding module PAD1. According to the step 1 of FIG. 10, the twenty-four least significant bits "A" (FIG. 9) of the incoming bit stream from the input In1 are transferred into the multiplexer MUX1. In the second step, the contents of the multiplexer MUX1 is coupled into the lower register B of the padding module PAD1. In the step 3, the most significant 24-bits A' of the bitstream entering through In1 are transferred to the multiplexer MUX1. In the step 4, the contents of the multiplexer MUX1 is stored in the upper register B' of the register within padding module PAD1. In this manner, 48-bits of data may be transferred to the padding module PAD1 in two separate transmissions. When transferring a value exceeding 24 bits, the sign bit is stored in the forty-seventh bit of the PAD1 module. Each step in FIG. 10 requires one clock pulse, such that the entire process disclosed in FIG. 10 requires four clock pulses.

In both the "pad" mode and the "sign_ext" mode, a 24-bit data path PE_INT is converted to a PE_LONG data field. In the case wherein the total incoming value is contained in the first 24-bits, the sign bit remains in bit twenty-three (the middle of the 48-bit field), and the left hand bits are padded with zeroes. In the case wherein a 48-bit value (including any value exceeding 24-bits) is transferred, two separate transfers between the multiplexer and the padding module must take place, and the sign-bit is stored in bit forty-seven, the most significant bit of the 48-bit PAD register. The value remains in the PE_LONG format through subsequent processing until the ALU_CLIP module reduces the 48-bit data stream back down to 24-bits, as discussed in greater detail herein.

Table 1 illustrates the binary control codes and identical operation and functionality of the padding modules PAD1 (discussed above), and PAD2 (discussed subsequently).

TABLE 1

| Action in PAD1 | mnemonic description | set_pad1 binary control code |
|---|---|---|
| PAD1 input receives PE_INT signal from MUX1 and pads upper portion of register with zeroes. | pad | 0 |
| PAD1 input receives PE_LONG signal from MUX1 and extends sign bit to 47th bit in PAD register. | sign_ext | 1 |

| Action in PAD2 | mnemonic description | set_pad2 binary control code |
|---|---|---|
| PAD2 receives PE_INT signal from In3 and upper pad portion of register zeroes. | pad | 0 |
| PAD2 receives PE_LONG signal from In3 and extends sign bit to 47th bit in PAD register. | sign_ext | 1 |

Each of the control codes, set_pad1 and set_pad2, is defined by a single bit. According to the syntax of Table 1, the command to place the first padding module PAD1 into the first mode, "pad" is "pad1=sign_ext." The control values for set_pad1 and set_pad2 are downloaded during the configuration phase.

After the padding operation is completed, the 48-bit output signal "pad_1" of padding module PAD1 forms the input signal into the arithmetic-logic shifter module, AL_SHIFT. The AL_SHIFT module performs various bit-shift operations to prepare the data for processing in the arithmetic logic unit ALU. In a logical shift, all bits are shifted a fixed number to the left or right according to the control signal, and zeroes are fed in to fill the bits. For example, in a logical a bit shift left of five bits, all binary values are shifted five bits to the left. Values stored in bit addresses 43–47 are shifted out, and bit addresses 0–4 are filled with binary zeroes.

The three shift functions or operational modes of the AL_SHIFT module are controlled by the 8-bit control, set_alshift. As illustrated in Tables 2 and 3, the eight-bit control signal, "set_alshift" can be divided into three subfields for controlling the shift of data. Bit 0 determines the operation (logical or arithmetic shift); bit 1 is the direction (right or left shift); and bits 2 through seven are the shift count.

TABLE 2

| Action | set_alshift | Comment |
|---|---|---|
| Logical shift | xxxxxxx0 | Shift left or right, with zeroes are shifted in. |
| Arithmetic shift | xxxxxxx1 | Right shift only: sign extend. |
| Shift right | xxxxxx0x | |
| Shift left | xxxxxx1x | |
| Shift count | cccccxx | ccccc = 000000 to 111111 (0 to 63) |

According to Table 2 above, when the least significant bit (bit zero) is a binary zero, the command is for a logical shift. When bit-zero is a binary one, an arithmetic shift is established. The value of bit one determines if the shift command is for a shift right, indicated by a binary zero, or for a left shift, indicated by a binary 1. Bits 2–7 determine the shift length. Since the PE_LONG data path as defined herein is preferably a forty-eight bit data path, a shift may be as little as one bit or as many as forty-seven bits. Since zeros are inserted into the "source" end of a logical shift, a logical shift greater than forty-seven bits would effectively "zero-out" the AL_SHIFT register. Those skilled in the art will recognize that a six bit field is required to identify binary values from zero to forty-eight. Accordingly, the "shift count" field "cccccc" in table 2 above is seen to be a six bit field. However, a six bit field may include values from zero to sixty three. Since shift counts greater than forty-seven bits are meaningless in a forty-eight bit data path or register, if a number greater than forty-seven bits is entered in the six bit shift count, the command is preferably flagged by the compiler. When all shift sequences are completed, the data is transferred from the output of the AL_SHIFT module to the arithmetic-logic-unit ("ALU").

Table 3 illustrates exemplary mnemonic operators for describing the control functions of Table 2.

TABLE 3

| Function | set_alshift mnemonic | Control code |
|---|---|---|
| Logical right shift "cccccc" bits | ilshr | cccccc00 |
| Arithmetic right shift "cccccc" bits | iashr | cccccc01 |
| Left shift "cccccc" bits | ishl | cccccc10 |

In implementing the mnemonic table and control commands of Tables 2 and 3 above, a bit shift left command with a shift length of three bits is syntactically represented as "set_alshift=iashl 3." This command produces the code 0000001110. The first and second bits (from the right) are written "10," which form the "logical shift left" command in the Table 3 above. The third and fourth bits in this example are "11," which form the least significant bits in the "cccccc" portion of the field. The "cccccc" shift count field begins at bit three of the control code. Although bit three would have a binary value of four if counting began at bit zero, the additive binary progression, 1, 2, 4, 8 . . . etc. for the shift count begins at the first bit of the bit count. Accordingly, the "11" found in bits three and four represents a shift count of three bits, not twelve bits. The values for all eight control bits for the AL_SHIFT module are downloaded during the configuration phase.

After the AL_SHIFT has completed all shift operations, the output signal alu_X of the AL_SHIFT module forms the first input signal into the arithmetic logic unit ALU. Because the ALU includes inputs from the multiplexer MUX4 as well as the AL_SHIFT module, the data paths leading to MUX4 is advantageously discussed at this time. Input In3 of the programming element 203 is coupled to the padding module PAD2, where the signal is converted from a 24-bit signal PE_INT to 48 bit signal PE_LONG suitable for processing by the arithmetic logic unit ALU. Because the padding module PAD2 (FIG. 6) receives data from only one source, input In3, no intermediate multiplexer is necessary to switch between optional inputs as was necessary to select the input to padding module PAD1. The operational mode of the padding module PAD2, "pad" or "sign_ext," is controlled by a 1-bit control signal set_pad2, which is determined prior to operation and downloaded during the configuration phase. The 48-bit PE_LONG output of the padding module PAD2 forms a first input to the multiplexer MUX4.

The second input to the multiplexer MUX4 is the 48-bit PE_LONG output signal MUL_OUT produced by the mathematical operation conducted by the multiplier 250, as discussed further discussed below. The multiplexer MUX4 selects between the 48-bit "pad2" signal from the padding module PAD2 and the 48-bit MUL_OUT signal from the multiplier 250. The switching of the multiplexer MUX4 is controlled by the 1-bit control signal sel_mux4, which is determined prior to operation and downloaded during the configuration phase. The output signal alu_Y of the multiplexer MUL4 forms the second input signal into the arithmetic logic unit ALU. As illustrated in FIG. 6, the inputs alu_Y and alu_X are both 48-bit signals conducted on a PE_LONG data path.

The ALU processes the dual 48-bit inputs alu_Y and alu_X according to a variety of arithmetic manipulations well known to those skilled in the art. Table 4 below includes examples of the various functions carried out within the ALU.

TABLE 4

| Action | | alu_op mnemonic | alu_op control code |
|---|---|---|---|
| alu_out = X + Y | (arithmetic) | op_add | 0000 |
| alu_out = Y − X | (arithmetic) | op_subX | 0001 |
| alu_out = X − Y | (arithmetic) | op_subY | 0010 |
| alu_out = X and Y | (logical) | op_and | 0011 |
| alu_out = X nand Y | (logical) | op_nand | 0100 |
| alu_out = X or Y | (logical) | op_or | 0101 |
| alu_out = X nor Y | (logical) | op_nor | 0110 |
| alu_out = X xor Y | (logical) | op_xor | 0111 |
| alu_out = X xnor Y | (logical) | op_xnor | 1000 |
| alu_out = X | (arithmetic) | op_X | 1001 |
| alu_out = not X | (logical) | op_invX | 1010 |
| alu_out = −X | (arithmetic) | op_negX | 1011 |
| alu_out = Y | (arithmetic) | op_Y | 1100 |
| alu_out = not Y | (logical) | op_invY | 1101 |
| alu_out = −Y | (arithmetic) | op_negY | 1110 |

According to Table 4 above, the command to produce the logical XOR of the two inputs (alu_out=X xor Y) would be syntactically represented as "alu_out=op_xor." This sets the alu_out control code to 0111. When the ALU has completed its operation, data is transferred from the output of the ALU to the input of the arithmetic-logic-circular-shifter ("ALU_SHIFT").

Since the output signal ALU_OUT of the ALU, and the output signal MUL_CLIP_OUT of the multiplier 250 are processed in an identical sequence of sub-components, a shifter, a rounding module and a clipping module, the inputs to the multiplier 250 are advantageously discussed at this time.

The second input In2 to the processing element 203 is a 24-bit data path coupled to the first input of the multiplexer MUX3. The second input of the multiplexer MUX3 is coupled to the 24-bit constant data register DR2, which is pre-loaded with a constant numerical value during the configuration of processing element 203. The multiplexer MUX3 is controlled by the control signal sel_mux3, which determines which of the two inputs, In2 or DR2, form the 24-bit output signal Mul_Y coupled to the first input of the multiplier 250. The control signal sel_mux3 is a one-bit control signal, the state of which is selected prior to operation and downloaded during the configuration phase.

The third input In3, which was earlier noted to form an input into the padding module PAD2, is also coupled to the first input of the multiplexer MUX2. The second input of the multiplexer MUX2 is coupled to the output signal ALU_CLIP_OUT, which, as discussed in greater detail below, is essentially the output signal of the arithmetic-logic-unit ALU after it has been reduced from a 48-bit data path to a 24 bit data path. The output Mul_X of MUX2 forms the second input to the multiplier 250. Accordingly, the second input Mul_X of the multiplier 250 will either be a fresh input signal, or a processed signal fed back from the arithmetic logic unit ALU. The multiplexer MUX2 is controlled by the control signal sel_mux2, which determines which of the two inputs, In3 or ALU_CLIP_OUT form the 24-bit output signal Mul_X coupled to the second input of the multiplier 250. The binary state of the control signal sel_MUX2 is determined prior to the processing of input data, and is downloaded into the processing element 203 during the configuration phase.

The 48 bit PE_LONG output MUL_OUT of the multiplier is coupled both to the shifter module MUL_SHIFT and to one of the two inputs of the multiplexer MUX4. The output MUL_OUT of the multiplier 250 forms a potential input to the arithmetic logic unit ALU if selected by the multiplexer MUX4, and the output ALU_OUT of the ALU, after further processing by the ALU_SHIFT, ALU_RND and ALU_CLIP modules, forms a potential input to the multiplier if selected by the multiplexer MUX2.

The multiplier 250 output MUL_OUT and the ALU output ALU_OUT are respectively coupled to identical "output shifters," ALU_SHIFT and MUL_SHIFT. In addition to having arithmetic shift and logical shift capabilities also found in the AL_SHIFT module discussed above, the output shifters also incorporate a circular shift function not found in the AL_SHIFT module. A circular shift distinguishes from a logical shift in that, in a logical shift left, a binary value in the most significant bit is shifted out. In a circular shift left, a bit exiting the most significant bit re-appears in the least significant bit. Similarly, in a logical shift right, binary values exiting bit zero (the least significant bit) are simply lost, but in a circular shift right, binary values exiting the least significant bit re-appear in the most significant bit.

In preparing a 48-bit value for narrowing down to 24-bits by a clipping module, one function of an output shifter is to re-position the most significant bits (numerically) or the most important bits (logically) into select bit addresses which are not subject to clipping or truncation. Accordingly, the output shifters help ensure that the data eventually made available to the 24-bit output Out2 is the most accurate representation possible of the relevant data delivered by the multiplier 250 and the ALU to the 48-bit data paths MUL_OUT and ALU_OUT. The output shifter has a nine bit control word. Bits zero and one control the type of shift: no shift, logical shift, circular shift, and arithmetic shift. Bit two controls the direction of the shift. Bits three through eight are the shift count, as illustrated in Table 5 below.

TABLE 5

| Action | set_alu_shift set_mul_shift | Comment |
|---|---|---|
| No shift | xxxxxxx00 | |
| Logical shift | xxxxxxx01 | Left or right shift; shift in zeroes |
| Arithmetic shift | xxxxxxx10 | Right shift only: sign extend |
| Circular shift | xxxxxxx11 | |
| Shift right | xxxxxx0xx | |
| Shift left | xxxxxx1xx | |
| (shift count) | ccccccxxx | cccccc = 000000 to 111111 (0 to 63) |

The "shift count" in the final row of Table 5 above is not technically an action, but is included in the table to illustrate the function of the left hand most bits as representing the shift count for the other six actions listed in Table 5 above. The values of the binary control signals set_mul_shift and set_alu_shift are determined and downloaded during the configuration phase prior to operation. Table 6 below lists the ALU_SHIFT and MUL_SHIFT functions, their control mnemonics, and the binary codes of the control signals. The control codes are identical for both control signals, set_alu_shift and set_mul_shift.

TABLE 6

| Output Shifter Function | mnemonics for set_alu_shift and set_mul_shift | Control Code |
|---|---|---|
| No shift | noshift | 000000000 |
| Left shift "ccccc" bits | shl | ccccc101 |
| Arithmetic right shift "ccccc" bits | ashr | ccccc001 |
| Logical right shift "ccccc" bits | lshr | ccccc001 |
| Circular left shift "ccccc" bits | cshl | ccccc111 |
| Circular right shift "ccccc" bits | cshr | ccccc011 |

As with the AL_SHIFT module above there is no arithmetic shift left. The only left shifts within the ALU_SHIFT and MUL_SHIFT modules are logical and circular. An example of the code for performing an "arithmetic right shift," a total of five bits would be "set_alu_shift=ashr 5" and the bit pattern produced in conjunction with the above tables for that command would be "000101001."

Upon completion of the ALU_SHIFT operation, the data in the ALU_SHIFT output is transferred to the input of the rounding module ALU_RND.

The outputs al_shift_out and mul_shift_out of the ALU_SHIFT and MUL_SHIFT modules are respectively coupled to the inputs of the ALU_RND and MUL_RND modules. Rounding occurs only after a right shift has taken place in the ALU_SHIFT or the MUL_SHIFT, and is based on the last bit shifted out of the least significant bit ("LSB") during an ALU_SHIFT operation. For a left shift or a circular shift, no rounding occurs. Positive numbers are rounded toward infinity if the LSB is one, and negative numbers are rounded toward negative infinity if the LSB is zero. Table 7 below illustrates the actions and control codes for the rounding functions. Since the rounding functions are identical for the ALU_RND module and the MUL_RND module, both are illustrated in Table 7 below.

TABLE 7

| Action | Command mnemonic | Code |
|---|---|---|
| No rounding or incoming signal. (alu_rnd = alu_shift) and (mul_rnd = mul_shift) | noround | 0 |
| Round incoming signal (alu_rnd = rounding of alu_shift) and (mul_rnd = rounding of mul_shift) | round | 1 |

According to the above table, the command syntax for disabling rounding in the ALU_RND module is "set_alu_round=noround."

The outputs alu_round_out and mul_round_out of the ALU_RND and MUL_RND modules are coupled to the respective inputs of the clipping modules ALU_CLIP and MUL_CLIP. Because the transmission of data between processing elements is conducted over 24-bit data paths, the clipping module reduces the data field from PE_LONG (48-bits) down to PE_INT (24-bits) by truncating the upper 24-bits. Each clipping module has three modes of operation. In the first mode, the upper 24-bits are devoid of meaningful data. An example of this is a positive number requiring less than 24 bits which has been shifted to the least significant twenty-four bits of the input to the clipping module. The left hand (most significant) 24 bits, being non-data, are simply truncated. Typically, non-data are all zeroes, though this is not always true. Because data is lost, the first mode of operation is known as a "no-clipping" process. For example, if a data range for MUL_OUT was anticipated, at the time of the pipeline configuration, to extend into bits 25, 26 and 27 of a 48-bit field, a shift operation could be pre-configured to shift all bits three bits to the right. The least significant bits would be lost in the process. The values remaining in the twenty-four lower bits of the field would be the most significant values, and the value represented therein would have 24-bit accuracy. The upper 24-bits would then be zeroes, and no data would be lost in their truncation.

The second and third modes actually perform data clipping in which some actual data is lost. However, the shifting and rounding processes discussed above are performed to ensure that the data discarded through the clipping process is the least significant data, thereby retaining the maximum possible accuracy in a 24-bit field. In the second operational mode, the value remaining after clipping is an unsigned 24-bit value. Being unsigned, the $24^{th}$ bit may be used to add scalar value to the stored number. In a 24-bit field, the numerical range 0 to PE_MAX_POS of an unsigned value is zero to 0xFFFFFFh (zero to 16,777,215). An unsigned 24-bit field is said to be "saturated".

In the third process, the signal is clipped to a signed 24-bit value in the range PE_MAX_NEG to MAX_POS, which, as discussed above, ranges from negative 8,388,608, or 0x800000h to positive 8,388,607, or 0x7FFFFFh.

The three different clipping processes are controlled by the two bit control signals "set_mul_clip" and "set_alu_clip" within their respective modules MUL_CLIP and ALU_CLIP. The control signal "set_mul_clip" therefore determines the character of the output signals MUL_CLIP_OUT and ALU_CLIP_OUT. Table 8 below summarizes the three different clipping actions performed by a clipping module, along with their respective mnemonic and binary codes.

TABLE 8

| Action | control signal | mnemonic | Binary Code |
|---|---|---|---|
| alu_clip_out = alu_round_out PE_INT (bits 0–23) | set_alu_clip | noclip | 00 |
| mul_clip_out = mul_round_out, PE_INT (bits 0–23) | set_mul_clip | | |
| alu_clip_out = clip_pos(alu_round_out) | set_alu_clip | clip_pos | 01 |
| mul_clip_out = clip_pos(mul_round_out) | set_mul_clip | | |
| alu_clip_out = clip_pos_neg(alu_round_out) | set_alu_clip | clip_pos_neg | 11 |
| mul_clip_out = clip_pos_neg(mul_round_out) | set_mul_clip | | |

According to the above table, the command syntax for setting the multiplier clipper between PE_MAX_NEG and PE_MAX_POS would be written: "set_mul_clip_out=clip_pos_neg." The binary values for the control code set_alu_clip and set_mul_clip are selected and downloaded during the configuration phase, and do not change during data processing.

As will be further discussed in conjunction with the conditional multiplexer CMUX, the clipping modules ALU_CLIP and MUL_CLIP respectively generate four arithmetic status bits. The four arithmetic status bits of ALU_CLIP form the control signal ALU_SW, and the four arithmetic status bits of MUL_CLIP form the control signal MUL_SW. One of the two control signals, ALU_SW and MUL_SW, is selected to determine the data path through the conditional multiplexer CMUX. These four arithmetic status bits comprising CMUX_SW, however, do not directly determine the switching of the conditional multiplexer CMUX. Rather, arithmetic status signal CMUX_SW is processed by a ten-bit "mask signal" sel_cmux."

The output 24-bit data path MUL_CLIP_OUT is coupled to the first input of the Multiplexer MUX5. A second input of multiplexer MUX5 is coupled to the output XB1 of the crossbar switch XBAR5x3. The output 24-bit data path ALU_CLIP_OUT is coupled to the first input of the Multiplexer MUX6. A second input of multiplexer MUX6 is coupled to the output XB2 of the crossbar switch XBAR5x3. As discussed in greater in conjunction with Table 15 each crossbar switch XBAR5x3 configurably routes any of five different crossbar inputs, In1, In2, In3, DR1 or DR2 to any of three crossbar switch outputs, XB1, XB2 and XB3, essentially providing direct throughput switching of the various input signals to the crossbar outputs. The controlled routing is achieved through three separate 3-bit control signals, sel_xb1, sel_xb2 and sel_xb3 which are preset during the configuration mode.

The multiplexer MUX5 is controlled by the 1-bit control signal sel_mux5, which is pre-set during the configuration process to select one of the two inputs of MUX5, XB1 or MUL_CLIP_OUT, as the output mux5_out of MUX5. The multiplexer MUX6 is controlled by the 1 bit control signal sle_mux6, which is pre-set during the configuration process to select one of the two inputs to MUX6, XB2 or ALU_CLIP_OUT, as the output mux6_out for MUX6. The outputs mux5_out and mux6_out form the inputs of the conditional multiplexer CMUX, discussed in greater detail herein.

As discussed above, in addition to the output signals ALU_CLIP_OUT and MUL_CLIP_OUT respectively generated by the ALU_CLIP and MUL_CLIP modules, the ALU_CLIP and MUL_CLIP modules are each capable of generating a 4-bit status signal. The 4-bit status signals, ALU_SW and MUL_SW reflect the respective state of select arithmetic status bits generated by the multiplier 250 and the ALU. One of these 4-bit status signals, ALU_SW or MUL_SW will be selected to form the control inputs of the conditional multiplexer CMUX. The 4-bit signal MUL_SW is coupled to the first input of the multiplexer MUX7, and the 4-bit signal ALU_SW is coupled to the second input of the multiplexer MUX7. The 1-bit control signal sel_mux7, which is pre-set to a pre-selected value during configuration, controls the multiplexer MUX7 to select one of the four-bit status words ALU_SW or MUL_SW as the output signal CMUX_SW of the multiplexer MUX7. This output signal CMUX_SW serves as the control signal of the conditional multiplexer CMUX. However, the four arithmetic status bits comprising CMUX_SW do not directly determine the switching of the conditional multiplexer CMUX. Rather, arithmetic status signal CMUX_SW is processed against a ten-bit mask signal, sel_cmux. Although the bit values comprising the 4-bit status signal CMUX_SW are generated through the processing of data, the mask signal sel_cmux is determined prior to operation and downloaded during the configuration process. The logical product of the four-bit arithmetic status signal CMUX_SW and the ten-bit mask signal sel_cmux determines if the output of the conditional multiplexer CMUX is the output signal from MUX5 or the output signal from MUX6. Various features of the control signal CMUX, the mask signal sel_cmux, and the logical interaction between them are illustrated in Tables 9–13 below.

The control signal CMUX_SW, as it interacts with the mask signal sel_cmux, dynamically controls the dynamic data path through the conditional multiplexer, CMUX, which is an important feature of the RDPP computational model. The conditional multiplexer has both conditional and unconditional modes, as determined by the most significant bit in the ten bit control code sel_cmux. In the "unconditional mode," the conditional multiplexer ignores the arithmetic status bits CMUX_SW and is simply switched the state of the ninth bit (bit 8). Table 9 below illustrates the control code for conditional and unconditional switching.

TABLE 9

| Conditional switching command | "sel_cmux" signal |
|---|---|
| Conditional switching of CMUX (determined by the arithmetic status bits cmux_sw, and by bits 0–8, cccccccc of the mask signal "sel_cmux") | 1xcccccccc |
| Unconditional switching of CMUX (dependant only on bit 9 (c) of sel_cmux, and unaffected by arithmetic status bits CMUX_SW or mask bits 0–8 (xxxxxxxx) of "sel_cmux." | 0cxxxxxxxx |

In referencing the bits of the control signal in Table 9, the "first bit" refers to the least significant bit, bit zero, and the "last bit" refers to the most significant bit, bit nine. As illustrated in Table 9 above, when the last bit of the control signal sel_cmux is a binary "one", the CMUX will conditionally switch data according to the logical product of the arithmetic status bits of CMUX_SW and bits 0–7 of the mask signal sel_cmux. If the last bit of sel_cmux is a zero, the switching will not be conditioned upon the interaction of status signal CMUX_SW and mask signal sel_cmux, but will be unconditionally determined by the status of bit eight (the ninth bit) of sel_cmux as further illustrated in Table 10 below.

TABLE 10

| Action | sel_cmux signal |
|---|---|
| Unconditionally select MUX5 | 00xxxxxxxx |
| Unconditionally select MUX6 | 01xxxxxxxx |

As discussed above, the outputs of MUX5 and MUX6 form the inputs of the conditional multiplexer. For exemplary purposes only, the default output of the conditional multiplexer is herein designated as the output of MUX5. As illustrated in Table 10 above, in the unconditional switching mode (binary zero in bit 9, the most significant bit of sel_cmux), a binary zero in sel_cmux(bit-8) will select the default output, mux5_out, as the output cmux_out of the conditional multiplexer CMUX. Alternatively, a binary one in sel_cmux(bit8) will select the output mux6_out as the output cmux_out of the conditional multiplexer CMUX.

As discussed previously, the "CMUX_SW" signal is a four bit control signal reflecting the value of various arithmetic status bits produced in the data processing of either clipping module ALU_CLIP or MUL_CLIP. The control signal, cmux_sw, is selected from the 4-bit arithmetic status signals ALU_SW and MUL_SW according to the switching of the multiplexer MUX7. These four status bits, described in Table 11 below, act as "control bits" in that they control the switching of the conditional multiplexer CMUX.

| Arithmetic Status (Bit) | Name | Meaning |
| --- | --- | --- |
| CMUX_SW(3) | Z | Bit is set to "1" if the data generated by the clipping module is zero. |
| CMUX_SW(2) | N | Bit is set to "1" if data (the clipping output) is negative. |
| CMUX_SW(1) | V | Bit is set to "1" if overflow has occurred in processing of data. |
| CMUX_SW(0) | U | Bit is set to "1" if underflow (negative underflow) has occurred in the processing of data. |

Because the signals ALU_SW and MUL_SW are output from the clipping modules, the term "data" as used in Tables 11–13 refers to the data processing and data output of the clipping modules ALU_CLIP and MUL_CLIP.

Flexibility is built into the program in that the mask signal sel_cmux may be configured to induce switching when a specific status bit of Table 12 is set to "1," or, alternatively, to induce switching of the CMUX when the state of the specific status bit is "0." This flexibility can be more clearly understood by examining the relationship of the status bits 0–3 of cmux_sw to the mask bits 0–7 of "sel_cmux" in Tables 13 and 14.

As discussed above, when the last bit of "sel_cmux" is a binary "one", the switching of the conditional multiplexer CMUX, is conditioned on the relationship of select arithmetic status bits CMUX_SW to the pre-configured mask "sel_cmux." Table 12 below illustrates the logical function of each bit within the pre-configured mask sel_cmux.

TABLE 12

| Mask bit sel_cmux (bit) | Arithmetic Status bit MUL_SW (bit) | Mnemonic | Significance if mask bit is true: |
| --- | --- | --- | --- |
| sel_cmux (7) | Z | if_zero | Switch CMUX if Z = 1 (when data = zero) |
| sel_cmux (6) | N | if_neg | Switch CMUX if N = 1 (when data is negative) |
| sel_cmux (5) | V | if_oflow | Switch CMUX if V = 1 (when overflow has occurred) |
| sel_cmux (4) | U | if_uflow | Switch CMUX if U = 0 (negative overflow has occurred) |
| sel_cmux (3) | nZ | if_not_zero | Switch CMUX if Z = 10 (when data is not zero) |
| sel_cmux (2) | nN | if_not_neg | Switch CMUX if N = 0 (when data is not negative) |
| sel_cmux (1) | nV | if_no_oflow | Switch CMUX if V = 0 (when no overflow has occurred) |
| sel_cmux (0) | nU | if_no_uflow | Switch CMUX if U = 0 (no negative overflow has occurred) |

The command "switch CMUX" in Table 12 refers to switching from the default input, which for exemplary purposes has been designated as MUX5, to the non-default input, MUX6. According to the above Table 12 above, if bit seven of the mask, sel_cmux(7) were set to a binary "one," it would allow switching of the conditional multiplexer CMUX when the status bit cmux_sw(3) were a binary "one," indicating that the 24-bit output data, either ALU_CLIP_OUT or MUL_CLIP_OUT, equaled zero. Similarly, if the mask bit sel_cmux(0) were configured as a binary "one" during the configuration process, the conditional multiplexer would switch from the default output of MUX5 to MUX6 whenever status bit cmux_sw(0), the "underflow" bit, was set to a binary "zero," indicating that no underflow had occurred. The architecture of each processing element PE 203 allows multiple conditional switches to activate switching of the conditional multiplexer CMUX provided they are not mathematically contradictory. A second positive switching command will not toggle back to the default multiplexer MUX5. Multiple affirmative switching commands will have the same effect as a single switching command, switching the conditional multiplexer CMUX from the default source to the alternative source. However, if multiple switching commands are mathematically contradictory, according to the preferred embodiment, the conditional multiplexer will revert to the default output. An example of mathematically contradictory switching signals would be if sel_cmux(7) and sel_cmux(3) were both set to a binary "one."

Table 13 below further illustrates the meaning and significance of individual bits in the mask sel_cmux, including the binary code for a specific mask operation. The conditional switching nomenclature in the first row, "cmux=mux6 if Zero else mux5," signifies that the CMUX will default to receiving input data from the output of MUX5, but will switch to receive input data from MUX6 if the arithmetic status bit "Z" (Table 11 above) becomes a binary "one". As discussed above, it is possible to effect switching from more than one status bit. Accordingly, the term "else" is not meant to exclude other status bits from affecting a switch from MUX5 to MUX6, but is simply incorporated to utilize common software code terminology.

TABLE 13

| Condition triggering switching | sel_cmux | Binary code |
| --- | --- | --- |
| cmux = mux6 if Zero else mux5 | if_zero | 1x1xxxxxxx |
| cmux = mux6 if Negative else mux5 | if_neg | 1xx1xxxxxx |
| cmux = mux6 if Overflow else mux5 | if_oflow | 1xxx1xxxxx |
| cmux = mux6 if Underflow else mux5 | if_uflow | 1xxxx1xxxx |
| cmux = mux6 if non-Zero else mux5 | if_not_zero | 1xxxxx1xxx |
| cmux = mux6 if non-Negative else mux5 | if_not_neg | 1xxxxxx1xx |
| cmux = mux6 if No Overflow else mux5 | if_no_oflow | 1xxxxxxx1x |
| cmux = mux6 if No Underflow else mux5 | if_no_uflow | 1xxxxxxxx1 |

According to the syntax of tables 9–13, an exemplary line of code fixing the conditional multiplexer to a specific path would appear as "sel_cmux=mux5 always." An exemplary line of code switching to the non-default input when the "Z" bit of MUL_SW becomes true would appear as "sel_cmux=if_zero."

Because these two lines of code are mutually exclusive, however, they are not offered as examples of code which can be used in conjunction with each other, but are offered as independent examples. In the first line of code, "sel_cmux= mux5 always," the conditional multiplexer CMUX is set unconditionally to received data from MUX5. It will be recalled that the last bit, bit-9, must be a binary zero to set CMUX to unconditionally receive input from a specific source. To select the default source, MUX5, bit-8 must be zero. Accordingly, the binary code representing the instruction "sel_cmux=mux5" is 0000000000. In the second line of code, "sel_cmux=if_zero," the CMUX will switch from the default input, MUX5, to the alternate source, MUX6, if the arithmetic status bit "Z," MUL_SW(3), is true, indicating that the 24-bit output ALU_CLIP_OUT or MUL_CLIP_OUT equals zero. The binary code representing this instruction in the sel_cmux control mask is 101xxxxxxx. Bits zero through six, shown as "x" may be in either state provided they do not contradict the logical implications of the binary "1" in bit seven. According to this mask command, if status bit Z becomes a binary "one," the conditional multiplexer CMUX will switch to MUX6 as its output. If the Z bit is not set, the CMUX will revert to the default source, MUX5. As discussed above, it is understood that either MUX5 or MUX6 could be selected as the default source according to a pre-determined architecture.

As previously noted, compound conditions may be specified, as illustrated by the following lines of code: "sel_cmux=if_zero" and "sel_cmux=if_not_negative." Assuming MUX5 is the default multiplexer in FIG. 5, according to the instructions expressed in code lines 4 and 5 above, CMUX will switch to the input from MUX6 if the result of a computation is non-negative (positive) or if the value is zero. As noted earlier, contradictory settings are flagged by the compiler. According to the preferred embodiment, the program will be rejected in the event of contradictory instructions. However, embodiments are envisioned wherein contradictory instructions act similar to an "unconditional" selection, defaulting to one of the two inputs in the face of contradictory instructions under any status-bit conditions.

Figure 11:
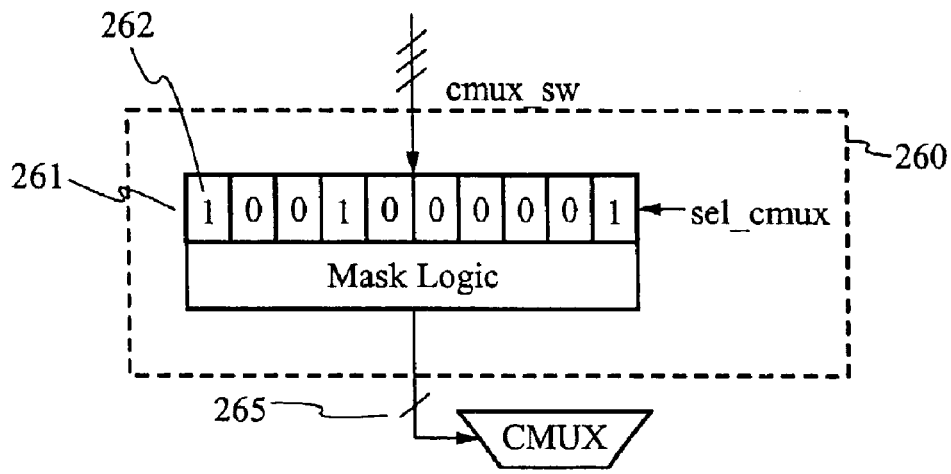
FIG. 11 is an illustration of a mask operation on a control signal.

FIG. 11 is an illustration of a mask 260 used to process the arithmetic status signal CMUX_SW. The binary status of mask signal sel_cmux is stored in a mask register 261, forming a binary mask 262. The control signal CMUX_SW representing the arithmetic status bits produced by either the ALU_CLIP module or the MUL_CLIP module is processed against the binary mask 262 according to preset mask logic 263. According to the preferred embodiment, a CMUX control output signal 265 determines the switching state of the conditional multiplexer CMUX. Although the mask 260 is illustrated in FIG. 11 as being separate from the conditional multiplexer CMUX, according to the preferred embodiment, the mask 260 is integral to the conditional multiplexer CMUX. Accordingly, the 4-bit signal CMUX_SW is generally depicted herein as the control signal which enters the conditional multiplexer CMUX and effects the switching of data paths therein.

The output cmux_out of the conditional multiplexer is coupled to the input of the first output register R_OUT1, thereby depositing the final form of the processed data into the output register R_OUT1. The 1-bit fire control signal fire1_PE controls the firing of the contents of the first output register R_OUT1 to the first output Out1 of the processing element 203.

As noted throughout the preceding discussion, the selective multiplexers MUX1–MUX7 each have two inputs, and are controlled by a one bit control signal. The control signal determines which of the two input signals will form the multiplexer output. The value of the control signal is preselected and downloaded during the configuration process, thereby defining the data path at that time. Table 14 below describes the various inputs which may be selected by the selective multiplexers MUX1 through MUX7 according to the control signal they receive. For example, an examination of FIG. 6 discloses that MUX1 may receive inputs from DR1 or In1. Therefore, the action "mux1=DR1" indicates that the control signal sel_mux1 controlling MUX1 is set to configure MUX1 to receive its input data from DR1 rather than In1. As noted in FIG. 6, multiplexer MUX4 is unique in that its inputs are 48-bit PE_LONG data paths, whereas the inputs of all other multiplexers in the processing element 203 are 24-bit PE_INT data paths.

TABLE 14

| Action | | Code |
|---|---|---|
| | sel_mux1 | |
| mux1 = In1 | sel_in1 | 0 |
| mux1 = DR1 | sel_dr1 | 1 |
| | sel_mux2 | |
| mux2 = In3 | sel_in3 | 0 |
| mux2 = ALU_CLIP_OUT | sel_alu_clip_out | 1 |
| | sel_mux3 | |
| mux3 = In2 | sel_in2 | 0 |
| mux3 = DR2 | sel_dr2 | 1 |
| | sel_mux4 | |
| mux4 = pad2_out | sel_pad2_out | 0 |
| mux4 = MUL_OUT | sel_mul_out | 1 |
| | sel_mux5 | |
| mux5 = MUL_CLIP_OUT | sel_mul_clip_out | 0 |
| mux5 = XB1 | sel_xb1 | 1 |
| | sel_mux6 | |
| mux6 = ALU_CLIP_OUT | sel_alu_clip_out | 0 |
| mux6 = XB2 | sel_xb2 | 1 |
| | sel_mux7 | |
| mux7 = ALU_SW | sel_mul_sw | 0 |
| mux7 = MUL_SW | sel_alu_sw | 1 |

In using the above table, if the binary control signal for MUX6 were a binary zero, the control signal would indicate "sel_sb2," and the multiplexer MUX6 would select the signal XB2 for its output.

The crossbar switch XBAR5x3 is a five-input, three-output crossbar (crosspoint) switch. The crossbar switch XBAR5x3 has five inputs, In1, In2, In3, and the data registers DR1 and DR2, and three outputs, XB1, XB2 and XB3. As discussed above, the data registers DR1 and DR2 are loaded with a predetermined constant values during the configuration process. As illustrated in FIG. 6, any of the five crossbar switch inputs, In1, In2, In3, DR1 and DR2 can be selectively routed to any of the three crossbar switch outputs XB1, XB2 and XB3 through the respective control of the pre-configured control signals sel_xb1, sel_xb2 and sel_xb3. The output XB3 forms the input to the second output register R_OUT2. The outputs XB1 and XB2 are respectively coupled to inputs of MUX5 and MUX6.

Table 15 illustrates the binary codes and control codes by which the respective control signals sel_xb1, sel_xb2 and sel_xb3 route the various inputs In1, In2, In3, DR1 and DR2 to the respective output ports XB1, XB2, XB3. Each control signal is 3-bits, and is pre-determined and downloaded during the configuration process.

TABLE 15

| Action | | Code |
|---|---|---|
| | sel_xb1 | |
| xb1 = DR1 | sel_DR1 | 000 |

TABLE 15-continued

| Action | | Code |
|---|---|---|
| xb1 = DR2 | sel_DR2 | 001 |
| xb1 = In1 | sel_In1 | 010 |
| xb1 = In2 | sel_In2 | 011 |
| xb1 = In3 | sel_In3 | 100 |
| | sel_xb2 | |
| xb2 = DR1 | sel_DR1 | 000 |
| xb2 = DR2 | sel_DR2 | 001 |
| xb2 = In1 | sel_In1 | 010 |
| xb2 = In2 | sel_In2 | 011 |
| xb2 = In3 | sel_In3 | 100 |
| | sel_xb3 | |
| xb3 = DR1 | sel_DR1 | 000 |
| xb3 = DR2 | sel_DR2 | 001 |
| xb3 = In1 | sel_In1 | 010 |
| xb3 = In2 | sel_In2 | 011 |
| xb3 = In3 | sel_In3 | 100 |

Returning to FIG. 6, the output of the second output register R_OUT1 is coupled to the second output Out2 of the processing element 203. A fire control signal, "fire2_PE" triggers the firing of the second output register R_OUT2 to the second output port, Out2 of the processing element 203. The fire control signal, fire2_PE, however, does not exercise independent control of the output register R_OUT2, but works in conjunction with the output enable signal ROut2_en. The output enable signal ROut2_en is predetermined and downloaded during the configuration phase, and must be enabled (in a binary one state) in order for the second output register R_OUT2 to fire to the output Out2. If the output register R_OUT2 is not enabled through the output enable signal ROut2_en, the output Out2 will hold its previous value regardless of the state or transition in the firing signal fire2_PE. If the output register ROut2 is enabled through output enable signal ROut2_en, the value stored in output register ROut2 will be sent from the second output register R_OUT2 to the output Out2 upon the a binary one in the fire control signal fire2_PE.

TABLE 16

| ROut1_en | fire1_PE | Action |
|---|---|---|
| 0 (binary zero) | 0 (binary zero) | Out1 holds previous values on 24-bit output bus. |
| 0 (binary zero) | 1 (binary one) | Out1 holds previous values on 24-bit output bus. |
| 1 (binary one) | 0 (binary zero) | Out1 holds previous values on 24-bit output bus |
| 1 (binary one) | 1 (binary one) | Send contents of output register R_Out1 to output Out1 on leading edge of fire1_PE signal. |

As noted in FIG. 6, there is no enable bit effecting the output of R_Out2. Accordingly, the primary output register, R_OUT1, is enabled by a run-time program, and cannot be disabled. The secondary output register, R_OUT2, is not used in all applications. It must therefore be explicitly enabled by the enable output ROut2_en. According to the preferred embodiment, fire control signals fire_1PE and fire_2PE are coupled to the same signal source, and will therefore go high and low simultaneously.

Configuration of the Processing Element

As discussed above, constant data registers DR1 and DR2 (FIG. 6, top) are twenty-four bit registers used for storing fixed numerical values. The values are downloaded during the configuration process. Because the most significant bit (bit 23 in a 24-bit register) is the sign bit, the maximum value which may be stored in either of the 24-bit constant data registers DR1 and DR2 is positive 8,388,607 and negative 8,388,608, the scalar value being stored in the twenty-three least significant bits. In Table 17, the value "n" represents the constant value stored in each of the respective constant registers DR1 and DR2. In a 24-bit register, this means that $(-8,388,608)<=n<=(+8,388,607)$. However, because the present invention envisions applications comprising constant data registers greater than 24-bits and less than 24-bits, Table 17 simply expresses these values as MAX_NEG and MAX_POS.

TABLE 17

| Action | Comments |
|---|---|
| Load DR1 = n | MAX_NEG <= n <= MAX_POS |
| Load DR2 = n | MAX_NEG <= n <= MAX_POS |

Although Table 17 illustrates the preferred embodiment, the present invention envisions alternative embodiments such as loading a 24-bit unsigned value in the constant data registers DR1 and DR2.

The configuration of each processing element ("PE") involves loading a total of one-hundred thirteen configuration bits into the processing element. The table below identifies these bits and their function. The first sixty-five bits, 0–64, addressed from right to left (least significant bit to most significant bit) are control bits, followed by the transmission of two separate twenty-four bit constant values which are to be loaded into the constant data-registers DR1 and DR2. Table 18 below illustrates the syntax of the bit stream.

TABLE 18

| Bit Number in Configuration Bitstream (beginning at zero) | Configuration signal | Number of bits | Default value |
|---|---|---|---|
| 0–3 | alu_op (0–3) | 4 | 0000 |
| 4 | set_pad1 | 1 | 0 |
| 5 | set_pad2 | 1 | 0 |
| 6–13 | set_alshift (0–7) | 8 | 00000000 |
| 14–22 | set_alu_shift (0–8) | 9 | 000000000 |
| 23–31 | set_mul_shift (0–8) | 9 | 000000000 |
| 32 | set_alu_round | 1 | 0 |
| 33 | set_mul_round | 1 | 0 |
| 34–35 | set_alu_clip (0–1) | 2 | 00 |
| 36–37 | set_mul_clip (0–1) | 2 | 00 |
| 38 | set_mux1 | 1 | 0 |
| 39 | sel_mux2 | 1 | 0 |
| 40 | sel_mux3 | 1 | 0 |
| 41 | sel_mux4 | 1 | 0 |
| 42 | sel_mux5 | 1 | 0 |
| 43 | sel_mux6 | 1 | 0 |
| 44 | sel_mux7 | 1 | 0 |
| 45–54 | sel_cmux (0–9) | 10 | 0000000000 |
| 55–57 | sel_xb1 (0–2) | 3 | 000 |
| 58–60 | sel_xb2 (0–2) | 3 | 000 |
| 61–63 | sel_xb3 (0–2) | 3 | 000 |
| 64 | ROut2_en | 1 | 0 |
| 65–88 | DR1 | 24 | 0...0 |
| 89–112 | DR2 | 24 | 0...0 |

As noted in Table 18, the default (initialization) bitstream is all zeroes. The default processing element behavior is to add In1 and In3 with no shifting, rounding or clipping, and to place the sum in R_Out1. These control bits are loaded by means of a series of configuration messages as discussed in conjunction with FIG. 12.

The Configuration Message

Figure 12:
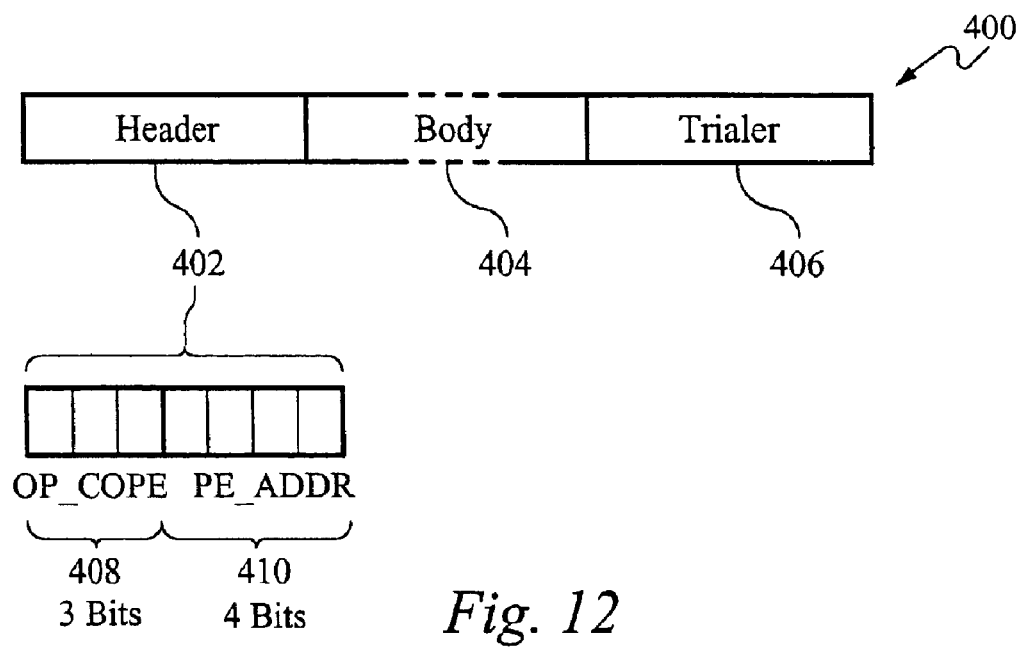
FIG. 12 is an illustration of processing element a configuration message.

FIG. 12 illustrates a configuration message 400 for loading configuration data into a processing element PE within a RDPP pipeline. Each configuration message comprises a header 402, a body 404 and a trailer 406. The body 404 of each configuration message is capable of storing up to 24-bits of information, thereby taking full advantage of the 24-bit data paths to the various processing elements. It is understood that, for embodiments utilizing data paths of more or less than 24-bits extending to the various processing elements, the body 404 of a configuration message 400 may be advantageously re-sized to take full advantage of the pipeline architecture. The data stored within the body 404 of the configuration message 400 is then downloaded into pre-determined configurations registers as determined by the header 402.

The header 402 of each configuration message 400 is a 7-bit field including a 3-bit operation code field "OP_CODE" 408 and a 4-bit PE address field ("PE_ADDR") 410. According to the binary capacity of a four bit PE_ADDR field 410, a configuration message may be directed to up to sixteen independently addressable processing elements, numbered zero through fifteen. The present invention envisions a pipeline comprising sixteen processing elements, thereby making optimal use of the storage capacity within PE_ADDR field 410 in the message header. Embodiments are envisioned, however, for RDPP pipeline processors comprising more than sixteen processing elements, and the capacity of the address field PE_ADDR 410 may be changed accordingly.

As noted in Table 18 above, there are at least one-hundred thirteen configuration bits, including the two 24-bit values stored in DR1 and DR2, which must be downloaded to configure a single processing element. Since no more than 24-bits may be downloaded into the processing element in any one configuration message, the downloading of 113-bits will require at least five separate configuration messages 400. To distinguish these five configuration messages, an OP code 408 within the header 402 designates which set of registers are to be configured by a particular configuration message. In order to identify at least five distinct configuration messages for each processing element, an operational code field OP_CODE field 408 comprising a minimum of three bits is also located in the header. The binary pattern stored in the OP_CODE field 408 identifies the configuration data being downloaded, and ensures that it is switched and routed to the proper configuration registers. Table 19 below illustrates the binary values for the operational codes and the configuration data corresponding to those particular OP_CODE.

TABLE 19

| Op Code of configuration message (3-bits) | Bit address within Body of Configuration Message. (0–23) | Configuration Bit Number (0–112) being downloaded | Control signal, mask or register being configured |
| --- | --- | --- | --- |
| 000 | 0–3 | 0–3 | alu_op (0–3) |
|  | 4 | 4 | set_pad1 |
|  | 5 | 5 | set_pad2 |
|  | 6–13 | 6–13 | set_alshift (0–7) |
|  | 14–22 | 14–22 | set_alu_shift (0–8) |
| 001 | 0–8 | 23–31 | set_mul_shift (0–8) |
|  | 9 | 32 | set_alu_round |
|  | 10 | 33 | set_mul_round |
|  | 11–12 | 34–35 | set_alu_clip (0–1) |
|  | 13–14 | 36–37 | set_mul_clip (0–1) |
|  | 15 | 38 | set_mux1 |
|  | 16 | 39 | sel_mux2 |
|  | 17 | 40 | sel_mux3 |
|  | 18 | 41 | sel_mux4 |
|  | 19 | 42 | sel_mux5 |
|  | 20 | 43 | sel_mux6 |
|  | 21 | 44 | sel_mux7 |

TABLE 19-continued

| Op Code of configuration message (3-bits) | Bit address within Body of Configuration Message. (0–23) | Configuration Bit Number (0–112) being downloaded | Control signal, mask or register being configured |
| --- | --- | --- | --- |
| 010 | 0–9 | 45–54 | sel_cmux (0–9) |
|  | 10–12 | 55–57 | sel_xb1 (0–2) |
|  | 13–15 | 58–60 | sel_xb2 (0–2) |
|  | 16–18 | 61–63 | sel_xb3 (0–2) |
|  | 19 | 64 | ROut2_en |
| 011 |  | 65–88 | DR1 |
| 100 |  | 89–112 | DR2 |
| 101 | 0–23 |  | Reserved |
| 110 | 0–23 |  | Reserved |
| 111 | 0–23 |  | Reserved |

As illustrated in Table 19 above; a 3-bit OP_CODE field within the header of the configuration message allows for the configuration message to be routed to a specific configuration register or group of configuration registers within a processing element. According to the exemplary values used in Table 19, a configuration message defined by the operational code "000" will contain 23 useful bits of configuration data in the 24 bit body. The configuration message will be routed to the processing element defined in the header address, the data stored in the body of the message will be downloaded into the processing element and used to configure the 4-bit control signal "alu_op", the 1-bit control signal "set_pad1," the 1-bit control signal "set_pad2," the 8-bit control signal "set_alshift," and the 9-bit control signal "set_alu_shift." Operational codes of 011 and 100 designate the storage of the two 24-bit constant values respectively stored in constant storage registers DR1 and DR1. It is understood, however, that the terms "value" and "constants" are not intended to limit the operations associated with these digital values to mathematical operations. The values may be used for any logical digital operation, ANDs, NANDS, bit shifts, etc., whether or not the operation is directed to a known mathematical operation.

Operational codes 101, 110 and 111 are reserved for future use. Among the various configuration features to which the reserved control codes may be directed, it is envisioned that the reserved operational codes may be used to store preset values for counters. As discussed in further detail below, the pipeline architecture of the present invention is particularly useful in outer space applications such as processing photographic and other scientific and sensory data. Such applications lend themselves to a repeatable sequence of firing codes. A counter with a predetermined preset value could be used to repeat a sequence of firing patterns a fixed number of times. As noted, the body of a configuration message is 24-bits in length, which can be downloaded into a counter preset register. Those skilled in the art will recognize that a counter with a 24-bit preset value is capable of exceeding a count of eight million. Because some processes for digital imaging require sequential operations of upwards of a million iterations, the architecture of the present invention is particularly amenable to such applications.

The message trailer 406 is preferably an eight bit field used to contain an error checking code such as a cyclical redundancy check or other error checking sum.

Operation of an RDPP Pipeline

Because dynamic power consumption is proportionally smaller in ULP technology, ULP circuits exhibit superior power consumption characteristics when running multiple operations or algorithms in parallel. Parallel run operations, accordingly, reduce the total throughput time required to calculate the final output value. Accordingly, use a processing element comprising a conditional multiplexer CMUX disclosed in FIG. 6 is particularly amenable to parallel processing operations in ULP circuits. By controlling the switching of the conditional multiplexer CMUX on the arithmetic status bits produced during data processing, each processing element can be conditioned to output data meeting certain pre-determined specifications, thereby preventing unfit data from passing through the selective multiplexer to the output Out1. Accordingly, the present invention utilizes a parallel pipeline configuration of multiple processing elements in conjunction with a selective multiplexer, thereby more fully exploiting the advantages made available through ULP technology.

By shutting down unused PEs additional power reductions can be achieved. The "shutting down" may be achieved in at least two ways. The first way is to place a software-programmable switch between the processing element and its power supply and ground lines. A second way is to dynamically adjust the back bias on a PE to raise the threshold. This has the effect of both throttling leakage power, and making the PE unresponsive to signals on the inputs, so that its internal gates do not change state and consume dynamic power. The first approach increases gate delays. The latter requires careful circuit design to manipulate the thresholds, as well as a CMOS process that supports these circuits.

Figure 13:
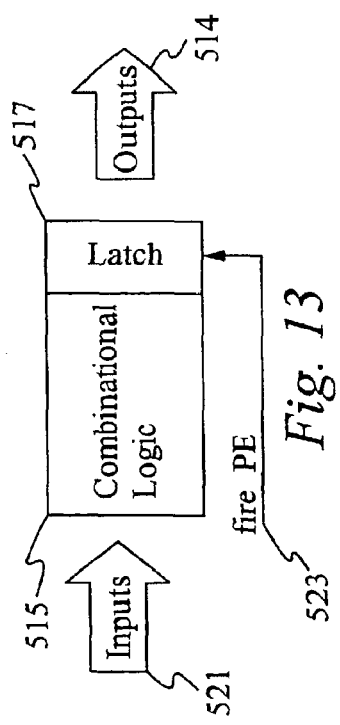
FIG. 13 is a simplified illustration of a processing element focusing on the firing of the latched output.

FIG. 13 is a simplified illustration of a single processing element that was illustrated in detail in FIG. 6. Contrasting FIG. 14 to the detailed processing element schematic in FIG. 6, the output latch 517 which represents both output registers R_OUT1 and R_OUT2 of FIG. 6. As noted, according to the preferred embodiment, the fire control signals fire1_PE and fire2_PE of FIG. 6 are a single signal. Accordingly, FIG. 13 is a simplified illustration of a processing element PE focusing on the firing of the latched output through the single fire control signal, fire_PE 523. The inputs 521 represent all inputs of FIG. 6, In1, In2, In3, DR1 and DR2. The outputs 519 represent all outputs of FIG. 6, Out1 and Out2. FIG. 13 is simplified in that all other circuitry illustrated in FIG. 6 is simplified by the combinational logic 523 of FIG. 13. The output latch 517 is controlled by the fire control signal fire_PE 523.

Figure 14:
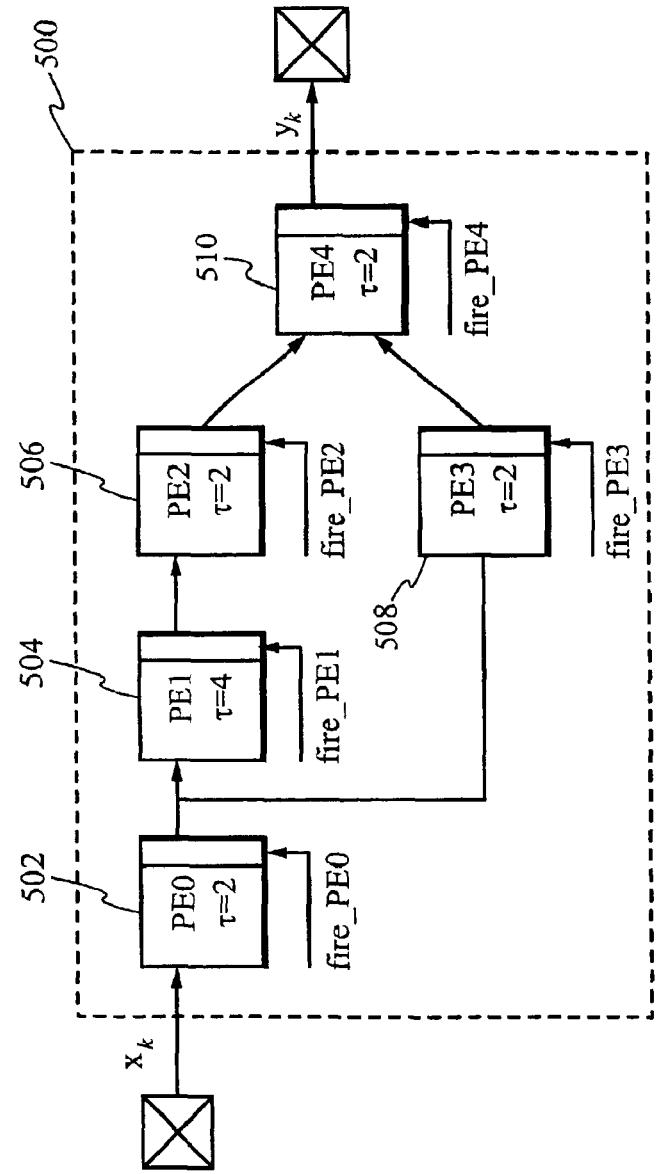
FIG. 14 illustrates a parallel pipeline processor configuration.

FIG. 14 illustrates a processing pipeline 500 for performing both sequential and parallel operations in processing data. Each block PE0 502, PE1 504, PE2 506, PE3 508, PE4 510 represents a separate processing element ("PE"), according to the simplified representation illustrated in FIG. 13. The various executable processes executed by PE0 502–PE4 510 are driven by a clock pulse (not shown). Advantageously, the same clock pulse drives all separate programming elements PE0 502–PE4 510, thereby achieving synchronicity. Each successive clock pulse therefore transitions the next cycle of a program. Within each processing element PE0 502–PE4 510, the value "$\tau$" represents the number of cycles necessary to execute and trigger the process executed by that particular processing element. $PE_{max}$ is used herein to designate the processing element within a pipeline requiring the greatest number of cycles $\tau_{max}$ to execute its assigned process, when compared against the other executable processes within the pipeline 500. According to the pipeline 500 of FIG. 14, $PE_{max}$ is PE1 504, and accordingly, $\tau_{max}$ of the pipeline 500 is 4 cycles.

FIG. 14 illustrates a timing chart defining the sequence of states being executed within various processing elements PE0 502–PE4 510 during successive cycles of an operating sequence within the processing pipeline 500. According to the preferred embodiment, during any program cycle, a given processing element PE0 502–PE4 510 will be in one of four states. In the "wait-state" W, a processing element is waiting for input data from the preceding processing element. In the "process-state" P, a processing element processes data by executing a set of logic instructions. A succession of consecutive processing states are possible for a given processing element. After a processing element PE0 502 . . . PE4 510 completes its processing, which may be accomplished in a single cycle or a succession of consecutive cycles, it enters the "firing state" F, wherein it couples its output to the next processing element. The firing, however, does not automatically occur on the cycle immediately following the last processing cycle. If a successor processing element ("PE") is not ready to receive the output from a preceding processing element ("PE"), the preceding PE will transition from the process-state "P" to a blocking state "B", wherein the control signal "fire_PE" (FIGS. 6 and 13) is blocked or suppressed until the successor PE is ready to receive data. The blocking state is repeatable for as many cycles as necessary. If a parallel branch is beginning comprising multiple successor processing elements, the blocking state will continue until all successor processing elements are ready to receive an input. In the blocking state, a processing element cannot process data, receive data, or fire the data which it has processed. Accordingly, a preceding processor will enter the blocking state if it has finished processing and the successor processor is in either a processing state or also in a blocking state. According to the preferred embodiment, a preceding processor may fire to a successor processor simultaneous with the firing of the successor processor.

Figure 15:
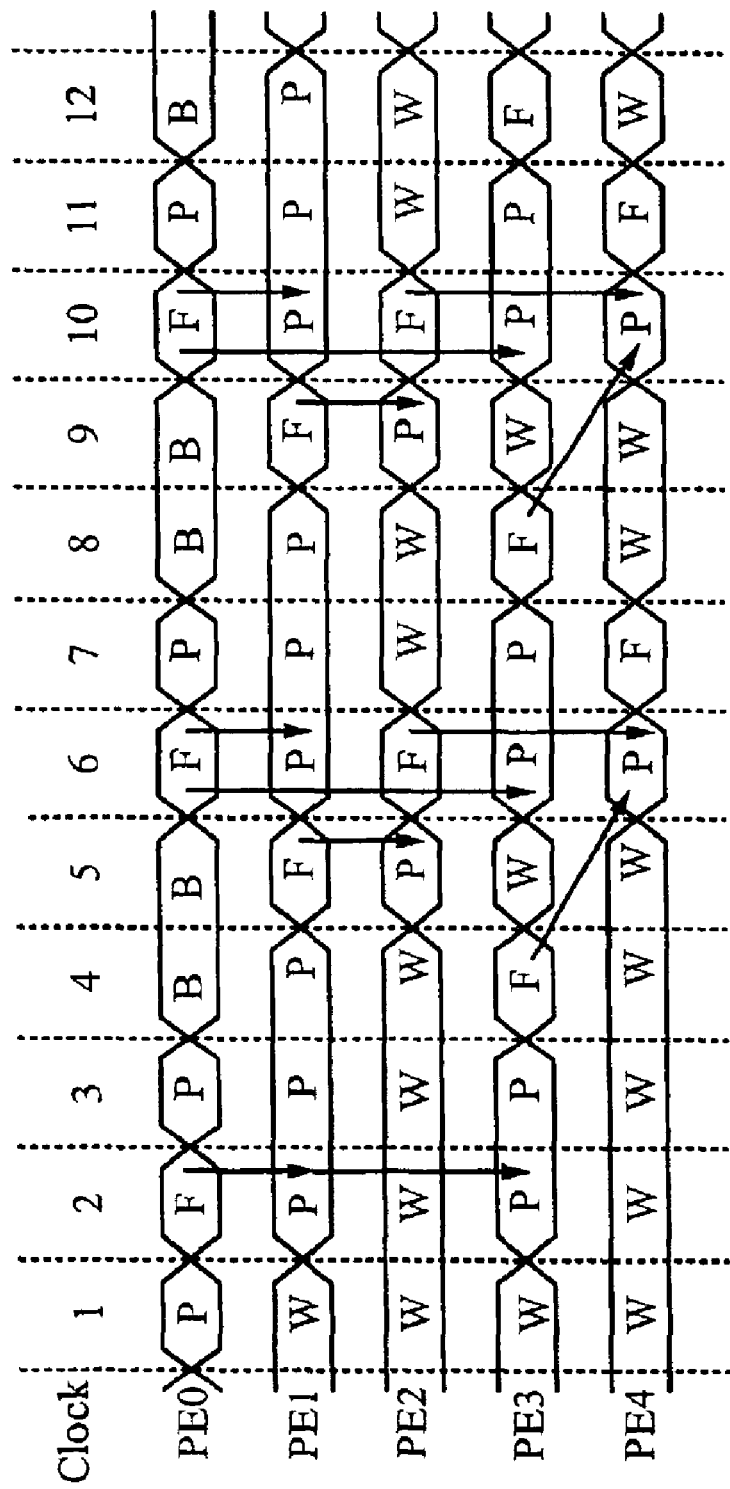
FIG. 15 illustrates a firing sequence of the parallel pipeline configuration of FIG. 14.

Within FIG. 15, the arrows illustrate the firing of output data from one processing element to another processing element. If an arrow is shown to extend over several cycles, the actual firing occurs at the earlier cycle, but the extension over several cycles illustrates that the data received in the firing is not processed until a the remaining necessary inputs are received. In cycle 1, PE0 502 has received data and is processing it. Since this is part of the initialization process, PE1 504–PE4 510 are seen to be in the wait-state "W," awaiting in input for processing.

In cycle 2, PE0 502 has fired, enabling PE1 504 and PE3 508 to begin processing. PE2 506 and PE4 510 remain in a wait state, awaiting valid data for processing.

In cycle 3, PE0 502 has received new data according to the exemplary program input depicted in the firing cycle of FIG. 15. PE0 502 begins processing data immediately upon receipt.

In cycle 4, PE0 502 is blocked from firing. It has finished processing, but cannot fire until PE1 504 and PE3 508 have completed processing and fired their outputs. Although a processing element may receive data and process before it's successors have fired, it may not fire until it's successors have fired. Accordingly PE0 502 has completed processing in step 3, but is blocked from firing in steps 4 and 5, as seen in the states P-B-B for cycles 3–5.

In cycle 5, PE1 504 couples and enables PE2 506 to start processing.

In cycle 6, PE0 502 transitions from the blocking mode to the firing mode. This can be understood by noting that PE3 508 fired in cycle 4, and PE1 504 fired in cycle 5. Because both of these processing elements are again free to receive data in cycle 6, PE0 502 is free to fire to them again, thereby enabling PE1 502 and PE3 508 to start processing again. PE2 506 also couples enabling PE4 510 to begin processing. It is noted that, according to the pipeline architecture of FIG.

14, processing element PE4 510 is the final processing element in the pipeline. As a general rule, the entrance of the last processing element within a pipeline to the process state "P" marks the transition from the initiation cycle to the first repeatable sequence. The repeatable sequence is equal to $\tau_{max}$ cycles. Accordingly, beginning in cycle 6, the timing chart of FIG. 15 will enter a repeatable sequence that is 4 cycles in length. This can be observed by examining the states of any single processing element in cycles 6, 7, 8 and 9, and comparing them to the succeeding four cycles. For example, cycles 6–9 of PE0 502 are seen to be F-P-B-B. The same cycle is repeated in the cycles 10–13. The repetition of processing cycles 6–9 can similarly be observed for all of the processing elements in FIG. 15.

Accordingly, clock cycles 1–5 of FIG. 15 represent the initialization sequence for the pipeline 500 of FIG. 15, and the states represented in cycles 6–9 represent the first cycle of a repeatable sequence. As noted, because $\tau_{max}$ within pipeline 500 is 4 cycles, the repeating sequence beginning in cycle 6 has a cycle length $\tau$ of four cycles.

In cycle 7, PE0 is assumed to receive data and begin processing again. As discussed above, if no input were forthcoming, PE0 would remain in the wait mode indefinitely through consecutive cycles until it received an input. PE1 will continue processing through cycles 7 and 8, and fire in cycle 9. Because PE1 will be unavailable to receive data until cycle 10, PE0 will remain in the wait mode through cycles 8 and 9. PE4 has finished processing the data it received, and enters the firing mode, outputting the data to the next segment, and enabling PE4 to receive input as soon as the next input is ready.

In cycle 8, PE0 enters the blocking mode, blocking any output until both successor processing elements, PE1 and PE3 have both finished processing their current contents and fired. PE1 continues processing, and PE3 couples to the input of PE4. Because PE4 will lack the input from PE2 until cycle 10, the input from PE3 alone will not enable PE4 to commence processing, and PE4 remains in the W "wait state" through cycle 8. Although ULP ("ultra low power") networks exhibit less power loss per clock cycle than an equivalent CMOS circuit operating in the region of five volts, there remains nevertheless some power loss through each clock cycle. Accordingly, embodiments are envisioned wherein most of the transistors comprising a specific processing element are isolated during wait states and blocking states for the executable process associated with that specific program, thereby reducing the dynamic power consumption.

In cycle 9, PE0 is again blocked since PE1 has not completed its processing and firing sequence. PE1 is firing to PE2, and PE2 begins processing the data input from PE1. PE3, having already fired and now waiting for a new input from PE0, enters the wait mode. Similarly, because PE4 has only received input from PE3, and continues to wait for input from PE2, PE4 also remains in the wait mode.

As discussed above, cycles 1–13, 14–17, etc. will simply repeat the state-sequence of cycles 6–9. Because $PE_{max}$ is PE1 504 in FIG. 14, the speed of the pipeline operation is limited by the 4-cycle $\tau_{max}$ of PE1 504. Additionally, it is noted that after the repeatable cycle begins in cycle 6, $PE_{max}$ will never enter the wait state. Being the slowest operation in the pipeline 500, the other processing elements are forced to wait for it.

Table 20 below is an illustration of a firing-sequence-table for controlling the output firing of the pipeline 500 of FIG. 14. Within Table 20, a binary "zero" is "do not fire" and a binary "one" is a command to fire an output latch corresponding to the fire control signal, as illustrated in FIGS. 12 and 13. The firing states in Table 20 conform to the "F" firing-states illustrated in FIG. 15. The Table is divided into two portions, the first portion, cycles 1–5, represent the initialization firing sequence. The second portion, cycles A, B, C, and D represent the repeatable sequence which commences following cycle 5. Because the are repeatable, they are defined by letters rather than numbers.

TABLE 20

| Clock Cycle | fire_PE0 | fire_PE1 | fire_PE2 | fire_PE3 | fire_PE4 |
| --- | --- | --- | --- | --- | --- |
| 1 | 0 | 0 | 0 | 0 | 0 |
| 2 | 1 | 0 | 0 | 0 | 0 |
| 3 | 0 | 0 | 0 | 0 | 0 |
| 4 | 0 | 0 | 0 | 1 | 0 |
| 5 | 0 | 1 | 0 | 0 | 0 |
| A | 1 | 0 | 1 | 0 | 0 |
| B | 0 | 0 | 0 | 0 | 1 |
| C | 0 | 0 | 0 | 1 | 0 |
| D | 0 | 1 | 0 | 0 | 0 |

According to the above table, during the first clock cycle 1, the fire control signals in all processing elements are zero, or "do not fire." In the clock cycle 1, the control signal applied to the control input fire PE0 is a binary "one" activating the firing of the output registers of processing element PE0 502. Subsequent cycles are interpreted in the same manner. According to the preferred embodiment, the repeatable portion of the cycle, A, B, C and D, is governed by a counter which counts the number of times the repeatable sequence is repeated, running the preset sequence a pre-determined number of times. As discussed above, a 24-bit counter preset allows for a sequence to be repeated over eight million times. Those skilled in the art will recognize that counter values exceeding the capacity of a counter preset register may be achieved by cascading counters together. Alternative embodiments are envisioned, however, wherein the number of times the repeatable sequence is run is not pre-determined by a counter, but determined dynamically through an evaluation of data.

Pipeline Architecture

Figure 16:
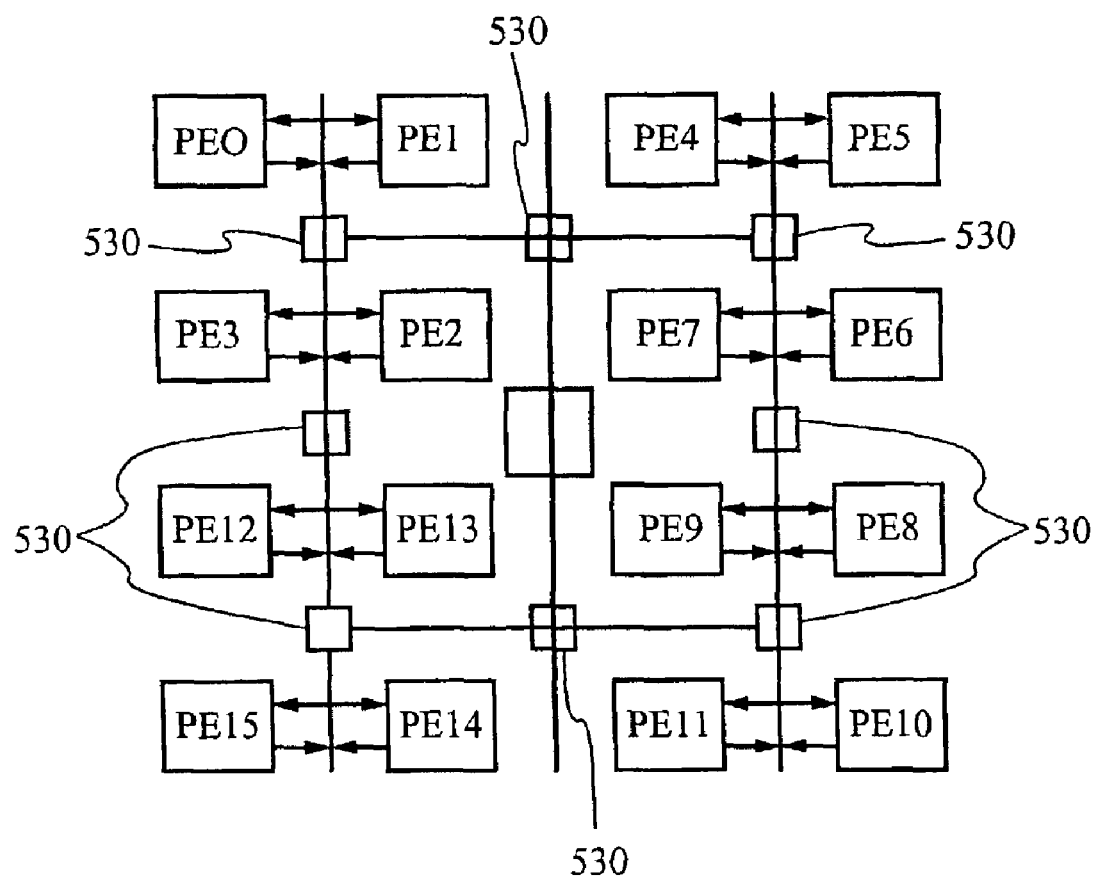
FIG. 16 illustrates a hierarchical configurable data path for interconnecting programming elements within a pipeline processor.

FIG. 16 further shows a block diagram of architectural features of the preferred embodiment of an RDPP pipeline according to the present invention. FIG. 5 briefly discussed the interconnectability of component processing elements in a pipeline 220 by means of input select logic 223 and output select logic 233. As further discussed in conjunction with FIG. 6, many of the internal paths within a processing element are advantageously 48-bit data paths, whereas the inputs In1, In2, In3, DR1 and DR2, and outputs Out1 and Out2 shown in FIG. 6 are advantageously 24-bit paths. Within the individual processing elements of FIG. 6, multiplexers provided the configurable data path.

Between processing elements, a more versatile method is required. Fully connected programmable interconnects consume significant chip area. As noted, the preferred embodiment utilizes sixteen processing elements per RDPP pipeline, although embodiments containing greater or fewer than sixteen processing elements are envisioned. Because a shared bus requires bus arbitration logic, and limits the activity on the bus to one module at a time, the current invention advantageously achieves interconnectability between the various processing elements, the RDPP architecture advantageously employs a hierarchical scheme as illustrated in FIG. 16. The hierarchical scheme specifically employs crossbar or crosspoint switches 530 which enable multiple "talkers" to connect to multiple "listeners" over dedicated connections in much the same way that pairs of telephone users talk over dedicated lines. According to commonly known switching theory, if a crossbar switch is serving N inputs and N outputs which may be configured and interconnected in any combination, producing N×N possible combinations, using k×k switches, the total states required for implementation is $\log_k$ N stages. Accordingly, an 8×8 crossbar can be implemented using 2×2 switches in three levels. This allows implementation of an effective address-encoding scheme, in which each bit of a destination address controls one level of switching. Because the number of permissible connection paths at each node differs according to the algorithm and computational model, and must further be evaluated against hardware costs, there is no preferred embodiment for the crossbar switching of the pipeline.

The reconfigurable nature of the RDPP pipeline permits fault tolerance through in-system reconfiguration to repair hardware failures. When a PE has failed, this can be detected through an onboard test procedure. An unused PE can then be identified, configured, and connected into the network of PEs thereby taking over the function of the failed PE. Those skilled in the art are familiar with the various methods for detecting system faults and re-configuring a system to utilize alternative resources.

Application Illustration of an RDPP

Although the present invention is not limited to any one application, some typical data-intensive spacecraft applications are digital filters, pixel readout correction, hyperspectral image data conversion, and object detection and tracking. According to these examples, the processor will be required to operate on at least four kinds of data: (1) sensor signal data; (2) address data; (3) data state information, such as pixel labels; and (4) status information such as "done" signals.

Figure 17:
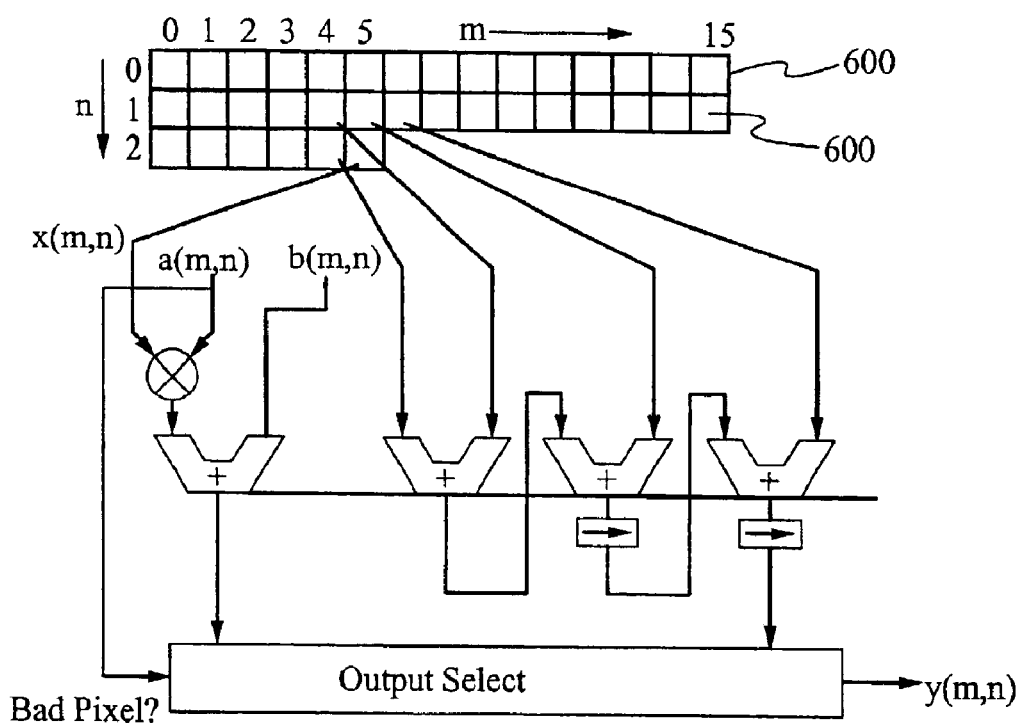
FIG. 17 illustrates an application of processing pixels through the pipeline processor of the present invention.

FIG. 17 is an illustration of the present invention used in conjunction with an "infinite response filter," which lends itself very well to the RDPP pipelined processors of the present invention. The output $y_k$ at sample time k is given by $$y_k = \sum_{i=0}^{3} a_i \cdot x_{k-1},$$

where $x_k$ is the input at sample time k. The filter coefficients $a_i$ are stored in registers in the processing elements, such as constant data registers DR1 and DR2 of FIG. 6. The input samples are delayed in the input data buffer. Accordingly, an output $y_k$ is derived from the respective product of the input $x_{k-1}$ and each of the four filter coefficients, $a_0$, $a_1$, $a_2$, and $a_3$. Because the output $y_k$ at sample time k is determined by inputs from the previous sample time k−1, the above four-tap example requires memory buffer for storing and correlating data being received and processed over a time delay. Sensor nonuniformity correction illustrates the use of conditional switching. Imaging focal plane arrays typically exhibit pixel-by-pixel variation due to manufacturing tolerances; in particular, each pixel has a brightness offset due to leakage or dark current, and a gain variation. To obtain accurate data, the sensor must be calibrated. In the calibration phase, an estimated offset and gain factor for each pixel is stored in memory. The actual image is restored accurately by correcting the pixel-by-pixel variation created by manufacturing tolerances. In operation, the information from each pixel is corrected by multiplying by its corrective gain factor, and adding its corrective offset.

According to FIG. 17, an array of pixels 600 representing incoming data (x) are defined by horizontal and vertical coordinates x(m,n). The gain and offset parameters are respectively defined as a(m,n) and b(m,n), so that the output (y) of the respective pixels is defined according to the linear equation:

$$y(m,n)=a(m,n)x(m,n)+b(m,n).$$

However, as the result of radiation, abuse, manufacturing defect, or some other failure mechanism some pixels may simply be "dead," or non-responsive due to. In this case, no gain or offset can meaningfully restore the actual input values sensed by that pixel. In such cases, the pixel value is commonly replaced by a spatial average of its neighbors. Using RDPP according to the present invention, however, the output values for the "good pixel" and "bad pixel" are calculated simultaneously. Two processing elements read the gain and offset values and correct each incoming pixel. The substitute values for a bad pixel are calculated by determining the average of three neighboring pixels by means of three or more processing elements. In the above example, a bad pixel is therefore replaced by the formula:

$$y(m,n)=\tfrac{1}{3}(x(m-1,n-1)+x(m,n-1)+x(n-1,n)).$$

The determination on whether or not a pixel is good is determined by calibration data, wherein a particular code indicates which case applies to the pixel. If the pixel is reliable, the actual scaled value is selected. If the pixel is defective, the value derived from the neighboring pixels is selected. The output signal is generated accordingly. By this process, when the conditional switch determines if the pixel is good or bad, all the data is ready and available for further processing. The conditional switching of the conditional multiplexer CMUX performs the selection of alternative output data, thereby substituting values for defective pixels without the delay imposed by repetitive serial processing after a pixel is discovered to be bad based on its unlikely output. If the above process were performed on a von Neumann processor, a first calculation would be made regarding a good pixel. The determination would then be made as to whether or not the pixel were sound or defective. If defective, a new calculation would have to be performed to determine the average values of the surrounding pixels. It can therefore readily be seen that data path selection through conditional multiplexing in conjunction with parallel pipeline processing is an improvement over the prior art.

What is claimed is:

1. A method of processing data through reconfigurable data path processor comprising a plurality of independent processing elements, including first processing element comprising a first PE output, and a conditional multiplexer with a first multiplexer input, a second multiplexer input and a first multiplexer output, the method comprising the steps:

a. processing a first data set according to a first algorithm within the first processing element, wherein the first data set comprises a first processable value and a second processable value;

b. generating a first processed output according to the processing of the first data set;

c. generating a first set of arithmetic status bits according to the processing of the first data set through the first algorithm;

d. sending the first set of arithmetic status bits to a first arithmetic status bit output;

d. evaluating the first set of arithmetic status bits; and e. establishing a first data path through the conditional multiplexer according to the evaluation of the first set of arithmetic status bits, wherein the first data path is selected from among a data path connecting the first multiplexer input to the first multiplexer output and a data path coupling the second multiplexer input to the first multiplexer output.

2. The method according to claim 1 wherein the step of processing a first data set is preceded by the step of configuring the first processing element.

3. The method according to claim 2 wherein the step of configuring the first processing element comprises the step of configuring a first plurality of data paths within the first processing element.

4. The method according to claim 2 further comprising a logical mask with a mask register and mask logic, wherein the step of configuring the first processing element comprises the step of downloading a binary mask pattern into the mask register.

5. The method according to claim 4 wherein the step of evaluating the first set of arithmetic status bits comprises the step of comparing the first set of arithmetic status bits to the binary mask pattern according to the mask logic.

6. The method according to claim 2 wherein the step of configuring the first processing element comprises the step of transmitting a first PE configuration message.

7. The method according to claim 2 further comprising the step of configuring a second plurality of data paths interconnecting the plurality of processing elements within the reconfigurable data path processor.

8. The method according to claim 7 wherein the step of configuring the second plurality of data paths comprises the step of transmitting a first pipeline configuration message.

9. The method according to claim 7 wherein the second plurality of data paths are configured within a hierarchical network of configurable data paths.

10. The method according to claim 2 further comprising the steps of:
   a. processing a second data set according to a second algorithm within the first processing element, wherein the second data set comprises a third processable value and a fourth processable value;
   b. generating a second processed output according to the processing of the second data set;
   c. generating a second set of arithmetic status bits according to the processing of the second data set through the second algorithm; and
   d. sending the second set of arithmetic status bits to a second arithmetic status output.

11. The method according to claim 10 wherein the first processing element comprises a first selective multiplexer with a third multiplexer input coupled to the first arithmetic status output, a fourth multiplexer input coupled to the second arithmetic status output, and a second multiplexer output, wherein the step of configuring a first plurality of data paths further comprises the step of configuring a path from the third multiplexer input to the second multiplexer output.

12. The method according to claim 10 wherein the first algorithm includes an arithmetic logic unit with a first ALU input, a second ALU input, and an ALU output, and the second algorithm includes a multiplier with a first MUL input, a second MUL input and a MUL output, the method further comprising the steps:
   a. inputting the first processable value into the first ALU input;
   b. inputting the second processable value into the second ALU input;
   c. inputting the third processable value into the first MUL input; and
   d. inputting the fourth processable value-into the second MUL input.

13. The method according to claim 10 wherein the first algorithm includes a multiplier and the second algorithm includes an arithmetic logic unit.

14. The method according to claim 3 wherein the processing element comprises a crossbar-switch with a plurality of crossbar-switch inputs and a plurality of crossbar-switch outputs including a first crossbar switch output and a second crossbar switch output, and wherein the step of configuring a plurality of data paths within the processing element comprises the step of controllably coupling a first input from among the plurality of crossbar-switch inputs to a first output from among the plurality of crossbar-switch outputs.

15. The method according to claim 2 wherein the step of configuring the first processing element comprises the step of downloading a first pre-determined value into a first constant-data register.

16. The method according to claim 12 wherein the first algorithm further comprises an first output shifter, a first rounding module and a first clipping module, and the second algorithm further comprises a second shifter, a second rounding module and a second clipping module.

17. The method according to claim 12 wherein the first processable value is derived from an output of the multiplier.

18. The method according to claim 12 wherein the third processable value is derived from an output of the arithmetic logic unit.

19. The method according to claim 13 further comprising a first constant data register configured to store a first fixed binary value, a second constant data register configured to store a second fixed binary value, a first PE input configured to receive a first binary input value, a second PE input configured to receive a second binary input value, and a third PE input configured to receive a third binary input value, the method further comprising the steps of:
   a. selecting the first processable value from among the first fixed binary value and the first binary input value;
   b. selecting the second processable value from among an output value derived from the arithmetic logic unit and the second binary input value;
   c. selecting the third processable value from among an output value derived from the multiplier and the second binary input value; and
   d. selecting the fourth processable value from among the second fixed binary value and the third binary input value.

20. The method according to claim 2 further comprising the steps:
   a. downloading a binary output value from the first multiplexer output to an output register;
   b. triggering the output register with a fire_PE control signal; and
   c. transmitting the binary output value from the output register to the first PE output.

21. The method according to claim 20 further comprising a second processing element with a fourth PE input and a second PE output, and a third processing element with a fifth PE input and a third PE output, wherein an output of the first PE is coupled to the fourth PE input, and an output of the first PE is coupled to the $5^{th}$ PE input, whereby the first processing element forms a source of divergence for a parallel processing configuration.

22. The method according to claim 21 wherein the reconfigurable data path processor is a ULP CMOS circuit.

23. The method according to claim 22 further comprising the steps:
   a. integrating the reconfigurable data path processor into a spacecraft; and
   b. shooting the spacecraft into outer space.

24. The method according to claim 20 further comprising second processing element with a second PE output coupled to an input of the first processing element selected from among the first PE input, the second PE input and the third PE input, and a third processing element with a third PE output coupled to an input of the first processing element selected from among the first PE input, the second PE input and the third PE input, whereby the first processing element forms a convergence of a parallel processing configuration.

25. An ultra low power reconfigurable data path processor for processing data, comprising a plurality of processing elements, a first processing element comprising:
   a. a conditional multiplexer comprising:
      i. a first multiplexer input;
      ii. a second multiplexer input;
      iii. a first multiplexer output; and
      vi. a first multiplexer control configured to select a data path according to a binary state of an arithmetic status input, the data path selected from among a first data path coupling the first multiplexer input with the first multiplexer output and a second data path coupling the second multiplexer input with the first multiplexer output; and
   b. a first processing component comprising:
      i. a first partially processed data input;
      ii. a first processed-data output; and
      iii. a first arithmetic status output, wherein the first arithmetic status output is configured to transmit a binary status of at least one select arithmetic status bit generated during data processing of the first processing component, the first arithmetic status output being couplable with the arithmetic status input of the first multiplexer.

26. The ultra low power reconfigurable data path processor according to claim 25 wherein the first multiplexer control comprises a data mask disposed between the arithmetic status input and a first multiplexer control input, the data mask comprising a mask input, a mask register for storing a pre-determined binary mask, mask logic, and a mask output, wherein the arithmetic status input is coupled to the mask and the mask output is coupled to the first multiplexer control input, such that the mask logic is configured to control a value of the mask output according to a comparison of a binary state of the at least one select arithmetic status bit with select bits within the pre-determined binary mask.

27. The reconfigurable data path processor of claim 26 wherein the data mask is integral to the conditional multiplexer.

28. The ultra low power reconfigurable data path processor according to claim 26 wherein the at least one select arithmetic status bit comprises a plurality of bits, including a zero status bit, a negative status bit, an overflow status bit and an underflow status bit.

29. The ultra low power reconfigurable data path processor according to claim 26 further comprising a first major processing component with a first and second major input and a first major output, wherein the major first major output is coupled to the first partially processed data input of the first processing component.

30. The ultra low power reconfigurable data path processor according to claim 29 further comprising:
   a. a second major processing component having a third and fourth major input and a second major output;
   b. a second processing component comprising
      i. a second partially processed data input;
      ii. a second processed data output; and
      iii. a second arithmetic status output; and
   c. a first selective multiplexer comprising:
      i. a third multiplexer input;
      ii. a fourth multiplexer input; and
      iii. a second multiplexer output, wherein the first selective multiplexer is configurable to selectively establish a data path selected from among a third data path coupling third multiplexer input to the second multiplexer output and a fourth data path coupling the fourth multiplexer input to the second multiplexer output, and wherein the second major output is coupled to the second partially processed data input, and wherein the first arithmetic status output is coupled to the third multiplexer input and the second arithmetic status output is coupled with the fourth multiplexer input.

31. The ultra low power reconfigurable data path processor according to claim 30 wherein the first major processing component is selected from among a group consisting of arithmetic logic units and multipliers, and the second major processing component is selected from among a group consisting of arithmetic logic units and multipliers.

32. The ultra low power reconfigurable data path processor according to claim 31 further comprising a crossbar switch comprising a plurality of crossbar inputs including a first crossbar input and a second crossbar input, and a plurality of crossbar outputs including a first crossbar output and a second crossbar output, wherein the crossbar switch is configurable to selectively route any crossbar input to any crossbar output.

33. The ultra low power reconfigurable data path processor according to claim 32 further comprising:
   a. a second selective multiplexer comprising
      i. a fifth multiplexer input;
      ii. a sixth multiplexer input; and
      iii. a third multiplexer output, wherein the second selective multiplexer is configurable to selectively establish a data path selected from among a fifth data path coupling the fifth multiplexer input to the third multiplexer output and a sixth data path coupling the sixth multiplexer input to the third multiplexer output, and
   b. a third selective multiplexer comprising
      i. a seventh multiplexer input;
      ii. an eighth multiplexer input; and
      iii. a fourth multiplexer output, wherein the third selective multiplexer is configurable to selectively establish a data path selected from among a seventh data path coupling the seventh multiplexer input to the fourth multiplexer output and an eighth data path coupling the eighth multiplexer input to the fourth multiplexer output, and wherein and wherein a first crossbar output is coupled to the fifth multiplexer input, the second processed data output is coupled to the sixth multiplexer input, the second crossbar output is coupled to the seventh multiplexer input, the first processed data output is coupled to the eighth multiplexer input, the third multiplexer output is coupled to the first multiplexer input, and the fourth multiplexer output is coupled to the second multiplexer input.

34. The reconfigurable data path processor of claim 33 wherein the first crossbar input is selected from a group consisting of a first processing element input, a second processing element input, a third processing element input, a first constant data register and a second constant data register, and wherein the second crossbar input is selected from a group consisting of a first processing element input, a second processing element input, a third processing element input, a first constant data register and a second constant data register.

35. The reconfigurable data path processor of claim 34 wherein the first major input is coupled to a terminal selected from among the second processed data output and the first processing element input, and wherein the second major input is coupled to a terminal selected from among the first constant data register and the second processing element input, and wherein the third major input is couple to a terminal selected from among the second constant data register and the third processing element input, and the fourth major input is coupled to a terminal selected from among the first processing element input and the first processed data output.

36. The reconfigurable data path processor according to claim 35 further comprising a third crossbar output, wherein the first multiplexer output is controllably coupled to a first processing element output and the third crossbar output is controllably coupled to a second processing element output.

37. The reconfigurable data path processor according to claim 36 further comprising
  a. a second processing element with a fourth processing element input coupled to an output of the first processing element, thereby forming a ninth data path; and
  b. a third processing element with a fifth processing element input coupled to an output of the first processing element, thereby forming a tenth data path, thereby forming a parallel path divergence.

38. The reconfigurable data path processor according to claim 36 further comprising
  a. a second processing element with a third processing element output coupled to an input of the first processing element, thereby forming a ninth data path; and
  b. a third processing element with a fourth processing element output coupled to an input of the first processing element, thereby forming a tenth data path, thereby forming a parallel path convergence.

39. The reconfigurable data path processor according to claim 37 wherein the ninth and tenth data paths are formed through a pipeline configuration command.

40. The reconfigurable data path processor according to claim 37 wherein the second processing element and the third processing element are configured to process data simultaneously.

41. The reconfigurable data path processor according to claim 33 wherein the second selective multiplexer is configurable to selectively establish a data path selected from among a fifth data path coupling the fifth multiplexer input to the third multiplexer output and a sixth data path coupling the sixth multiplexer input to the third multiplexer output according to a processing element configuration message.

42. The reconfigurable data path processor according to claim 37 wherein the first major processing component and the second major processing component comprise a radiation tolerant ultra low power CMOS circuit configured for use in outer space.

* * * * *